United States Patent
Baldi et al.

(10) Patent No.: US 12,400,551 B2
(45) Date of Patent: Aug. 26, 2025

(54) METHOD AND SYSTEM FOR DETECTING AND CLASSIFYING MANOEUVRES EXECUTED BY AN AIRCRAFT ON THE BASIS OF MEASURES ACQUIRED DURING A FLIGHT OF THE AIRCRAFT

(71) Applicant: LEONARDO S.P.A., Rome (IT)

(72) Inventors: Andrea Baldi, Samarate (IT); Ugo Mariani, Samarate (IT); Daniele Mezzanzanica, Samarate (IT); Mara Tanelli, Milan (IT); Francesco Zinnari, Milan (IT); Giovanni Coral, Milan (IT); Francesco Braghin, Milan (IT); Gabriele Cazzulani, Milan (IT)

(73) Assignee: LEONARDO S.P.A., Rome (IT)

( * ) Notice: Subject to any disclaimer, the term of this patent is extended or adjusted under 35 U.S.C. 154(b) by 255 days.

(21) Appl. No.: 18/267,576

(22) PCT Filed: Dec. 17, 2021

(86) PCT No.: PCT/IB2021/061957
§ 371 (c)(1),
(2) Date: Jun. 15, 2023

(87) PCT Pub. No.: WO2022/130334
PCT Pub. Date: Jun. 23, 2022

(65) Prior Publication Data
US 2024/0105065 A1    Mar. 28, 2024

(30) Foreign Application Priority Data
Dec. 18, 2020   (EP) .................................... 20425059

(51) Int. Cl.
*G08G 5/00*     (2025.01)
*G08G 5/30*     (2025.01)
(Continued)

(52) U.S. Cl.
CPC ................. *G08G 5/50* (2025.01); *G08G 5/30* (2025.01); *G08G 5/55* (2025.01)

(58) Field of Classification Search
CPC ... G08G 5/30; G08G 5/50; G08G 5/55; G06F 11/3409; G06F 13/00; G06F 17/50;
(Continued)

(56) References Cited

U.S. PATENT DOCUMENTS

| | | | |
|---|---|---|---|
| 7,835,866 B2 * | 11/2010 | Tzidon | G08G 5/80 701/14 |
| 8,744,651 B2 * | 6/2014 | Bates | G05B 23/0254 701/4 |

(Continued)

FOREIGN PATENT DOCUMENTS

| | | |
|---|---|---|
| EP | 2270618 | 1/2011 |
| EP | 2384971 | 11/2011 |
| EP | 3462266 | 4/2019 |

OTHER PUBLICATIONS

International Search Report and Written Opinion in corresponding International Patent Application No. PCT/IB2021/061957, mailed Mar. 22, 2022 (13 pages).

*Primary Examiner* — Andrew Joseph Rudy
(74) *Attorney, Agent, or Firm* — Leason Ellis LLP

(57) ABSTRACT

Method implemented through a computer for detecting the execution, by an aircraft, of a manoeuvre belonging to a macrocategory among a plurality of macrocategories, including: receiving a data structure with a plurality of time series of values of quantities relating to a flight of the aircraft; for each time duration among a plurality of predetermined time durations, selecting a corresponding subset of the data structure and extracting a corresponding feature vector; on the basis of the feature vectors, generating a corresponding input macrovector and applying to the input macrovector an output classifier to generate estimates (Continued)

indicative of the probability that the aircraft was performing manoeuvres belonging to the macrocategories.

18 Claims, 30 Drawing Sheets

(51) Int. Cl.
    *G08G 5/50*         (2025.01)
    *G08G 5/55*         (2025.01)

(58) Field of Classification Search
    CPC .... G06F 17/5009; G06F 19/00; G01M 17/00; G06N 20/00; G01C 21/20; G07C 3/00; G07C 5/0808
    See application file for complete search history.

(56) References Cited

U.S. PATENT DOCUMENTS

| | | | |
|---|---|---|---|
| 9,898,934 B2* | 2/2018 | Wang | G08G 5/26 |
| 12,271,208 B2* | 4/2025 | O'Flaherty | G05D 1/654 |
| 2023/0093761 A1* | 3/2023 | Krenz | B64D 43/00 |
| | | | 701/14 |
| 2023/0093956 A1* | 3/2023 | S | G08G 5/80 |
| | | | 701/3 |

* cited by examiner

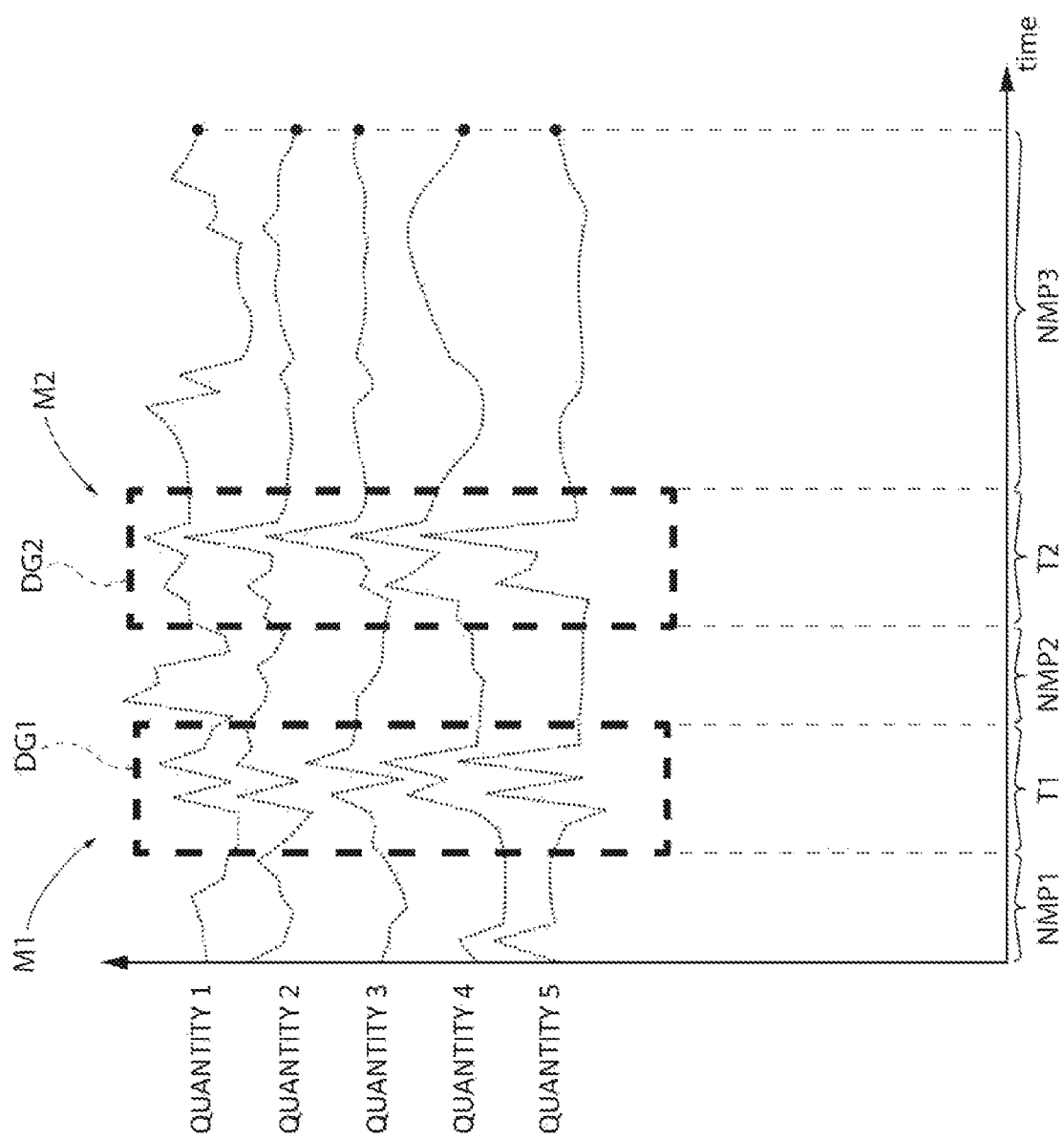

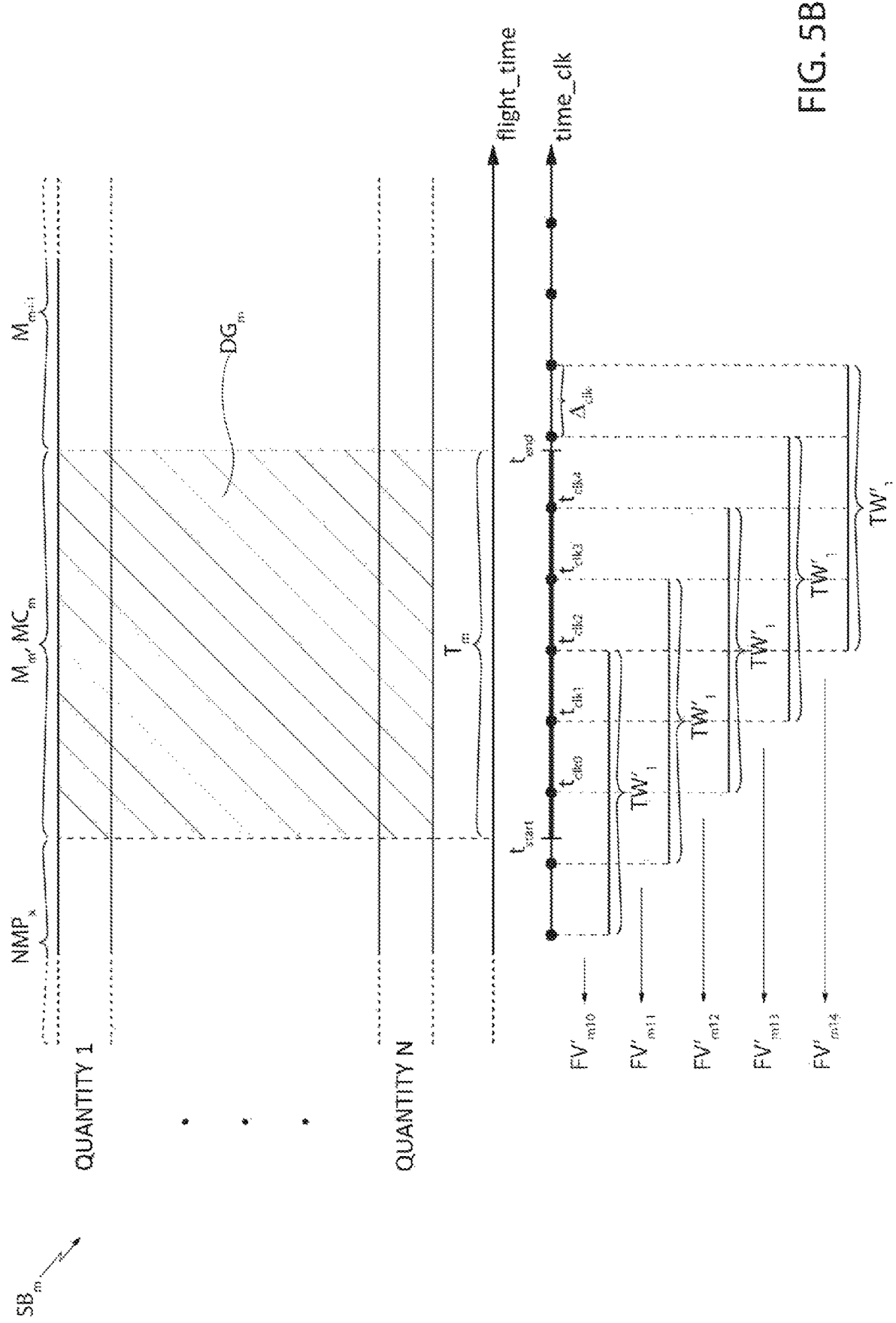

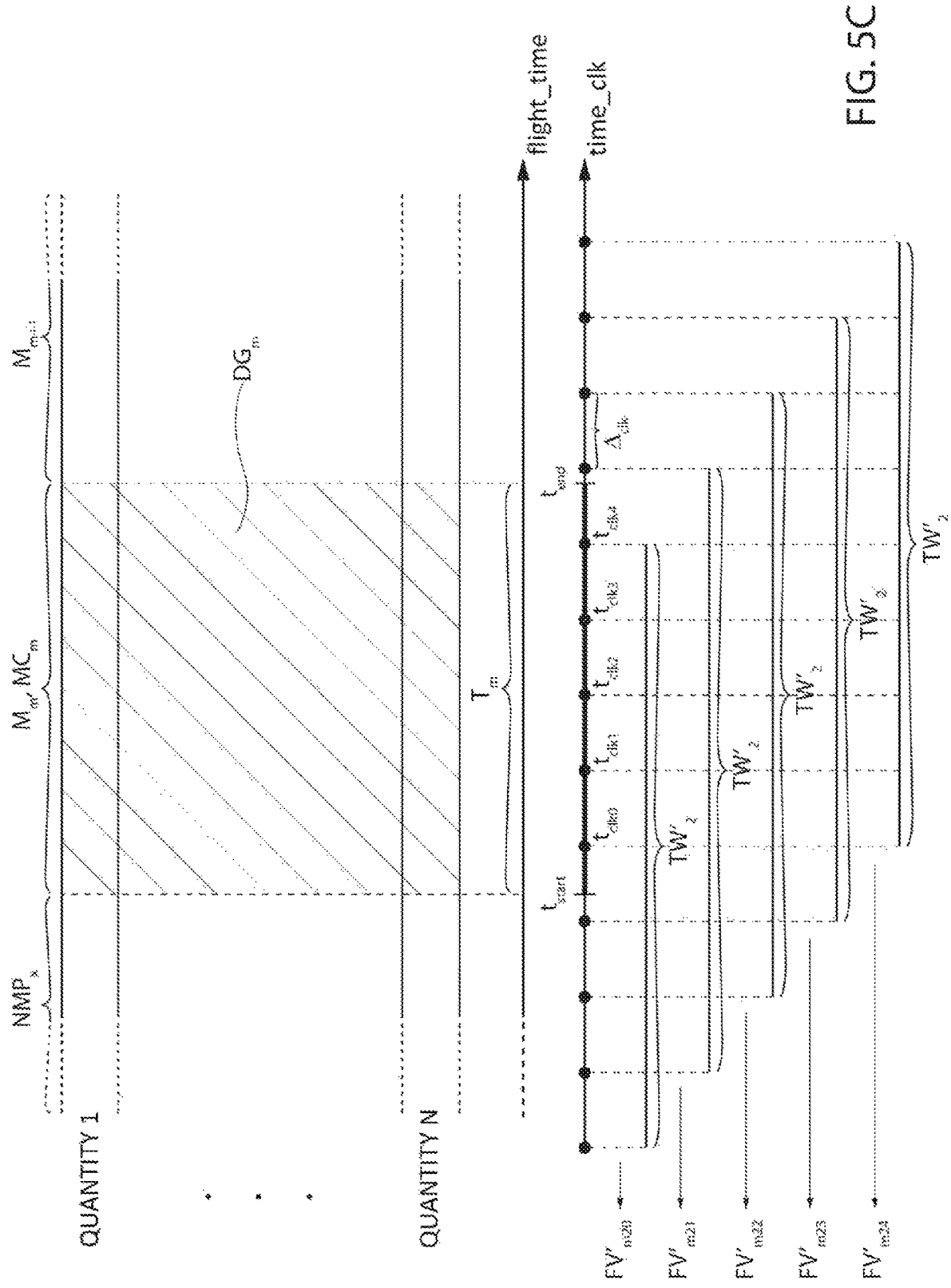

METHOD AND SYSTEM FOR DETECTING AND CLASSIFYING MANOEUVRES EXECUTED BY AN AIRCRAFT ON THE BASIS OF MEASURES ACQUIRED DURING A FLIGHT OF THE AIRCRAFT

CROSS-REFERENCE TO RELATED APPLICATIONS

This patent application is a U.S. National Phase Application under 35 U.S.C. § 371 of International Patent Application No. PCT/IB2021/061957, filed on Dec. 17, 2021, which claims priority from European patent application no. 20425059.1, filed on Dec. 18, 2020, all of which are incorporated by reference, as if expressly set forth in their respective entireties.

TECHNICAL FIELD

The present invention relates to a method and system for detecting and classifying manoeuvres executed by an aircraft on the basis of measures acquired during a flight of the aircraft.

BACKGROUND ART

As is known, in aeronautics the need to monitor the state of fatigue, and more generally the state of health, of the components of an aircraft is particularly felt, in order to be able to accurately estimate the remaining life time of each component, and therefore to optimize maintenance activities, without compromising flight safety.

In particular, it is known that the state of fatigue to which the components of an aircraft are subjected depends on the manoeuvres to which, during usage, the aircraft has been subjected, since the loads to which each component is subjected depend on the manoeuvres carried out by the aircraft. Consequently, the need is felt to correctly identify the manoeuvres executed by an aircraft, so that the so-called "real usage spectrum" can then be determined. To this end, it is known to equip aircraft with monitoring systems adapted to detect the time trends of quantities relative to the flight; this allows to acquire a large number of measurements, which can be analysed to study the history of the manoeuvres carried out by the aircraft. However, the Applicant has observed that, even having such measurements, the correct identification of the executed manoeuvres requires the execution of advanced data processing techniques and is also hampered by the fact that different manoeuvres typically have different durations, which complicates the analysis of the aforementioned time trends.

EP 2384971 discloses a method for determining a manoeuver performed by an aircraft having sensors for monitoring motion data, the method including: periodically sampling the sensors to electronically determine segments of motion data of the aircraft; aggregating sequences of the segments of the motion data; comparing the aggregated segments of motion data to models of particular manoeuvers; and determining the manoeuver performed by the aircraft.

EP 2270618 discloses a method for fault determination for an aircraft, which includes: generating a predicted manoeuver based on a model of aircraft performance; determining an actual manoeuver of the aircraft using information obtained from an inertial measurement system; and comparing the predicted manoeuver and the actual manoeuver.

EP 3462266 discloses a method for maintaining an aircraft based on a plurality of maintenance messages generated during operation of the aircraft.

DISCLOSURE OF INVENTION

Aim of the present invention to provide a method for detecting the type of manoeuvres executed during the flight of an aircraft, which at least partially satisfies the aforementioned requirement.

According to the present invention, there are provided a method and a system for detecting and classifying, as defined in the appended claims.

BRIEF DESCRIPTION OF THE DRAWINGS

For a better understanding of the present invention, embodiments thereof are now described, purely by way of non-limiting example, with reference to the accompanying drawings, in which:

FIG. 1B shows examples of trends over time of values of quantities acquired through monitoring systems;

FIGS. 5B and 5C schematically show the part of the training data structure shown in FIG. 5A and the arrangement of time windows having two different time durations, respectively;

FIG. 15 shows a table exemplifying part of the operations shown in FIGS. 12 and 13;

BEST MODE FOR CARRYING OUT THE INVENTION

Figure 1A:
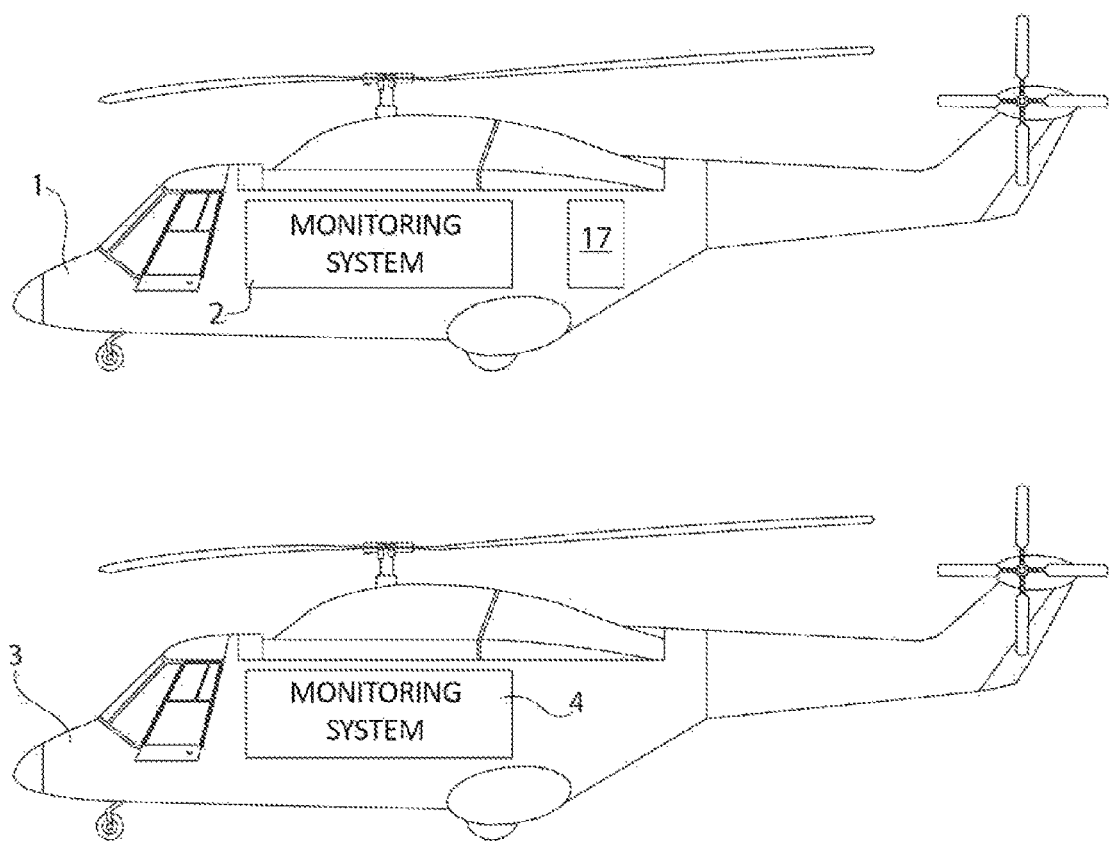
FIG. 1A is a schematic view of aircrafts equipped with monitoring systems.

The present method builds on the fact that it is currently possible to equip an aircraft (for example, a helicopter) with numerous sensors, which allow to determine the trends of corresponding quantities that characterize the flight of the aircraft, that is, during the execution of a succession of manoeuvres. In other words, it is possible to monitor the values that are assumed by said characteristic quantities during the flight. For example, FIG. 1A shows a helicopter 1, which is equipped with a monitoring system 2, which includes, for example, a sensor for measuring the bank angle of the helicopter 1 and thus provides, in use, the values (i.e., the samples) of the bank angle, with a given sampling frequency, for example of the order of ten Hertz. In the continuation reference is made to the aforementioned quantities as to the primary quantities and it is assumed that they are in a number equal to N; purely by way of example, the primary quantities may include: aircraft kinematics variables (such as pitch angle, roll angle, yaw angle, heading angle, vertical acceleration, vertical velocity, longitudinal acceleration, lateral acceleration, roll rate, pitch rate, yaw rate, Northward velocity, Eastward velocity, main rotor velocity); aircraft control variables (such as for example collective control position, lateral cyclic control position, longitudinal cyclic control position, pedal position); environmental variables (such as for example air speed, radar altitude, barometric altitude, wind speed, wind direction, total air temperature, take-off weight); variables related to energy systems (such as motor torque, motor turbine rotation speed, motor generator rotation speed).

Purely by way of example, FIG. 1B shows the trends over time of five primary quantities (indicated respectively as quantities 1-5; hence N=5), which are monitored by corresponding sensors of the monitoring system 2, which periodically provide the corresponding samples. For simplicity's sake, and without any loss of generality, it is assumed that the sensors operate synchronously, with the same sampling frequency $f_c$ (for example, equal to 12.5 Hz); in fact, even if the sensors operated natively with different sampling frequencies, it would be in any case possible to return to the same sampling frequency, for example through oversampling, subsampling and interpolation operations.

Still by way of example, FIG. 1B shows a first and a second time interval T1, T2, in which a first and a second test manoeuvre M1, M2, respectively, of a first test flight of the helicopter 1, as signalled by the pilot, take place. In addition, in FIG. 1B, NMP1, NMP2, NMP3 respectively indicate three periods of time spaced with respect to the first and second time interval T1, T2, in which no manoeuvres are signalled by the pilot, as described in greater detail below.

Hereinafter, the periods of time NMP1, NMP2, NMP3 are referred to as non-labelled periods.

Figure 2:
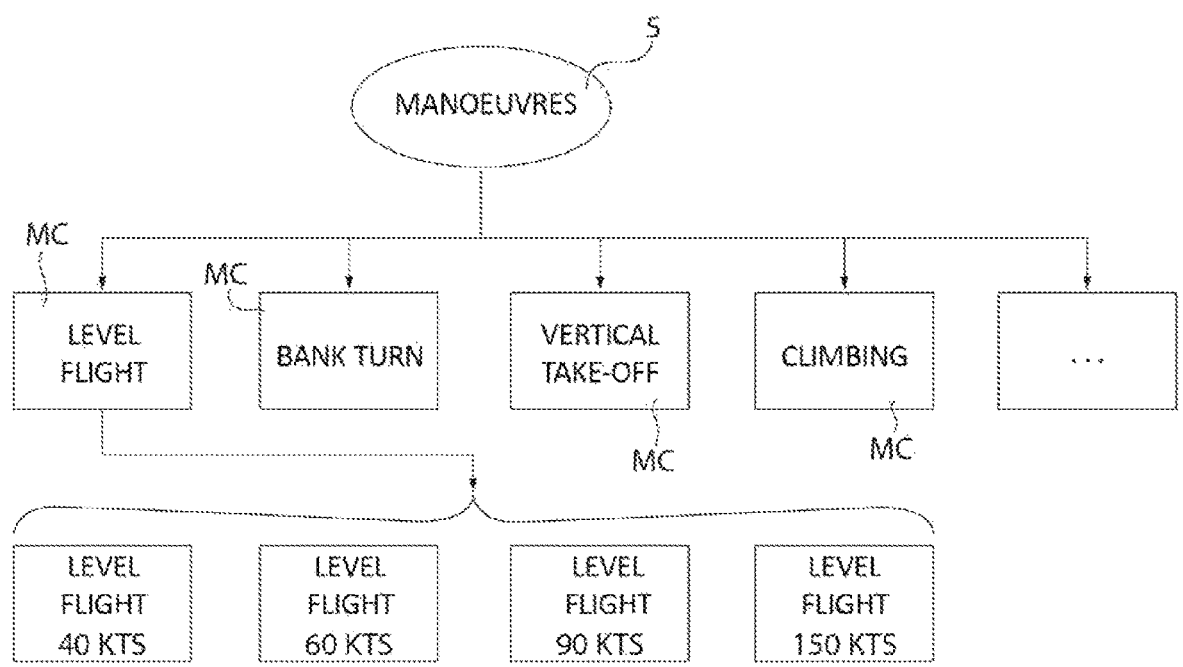
FIG. 2 shows a block diagram which exemplifies a possible subdivision into macrocategories of a set of manoeuvres that can be executed by an aircraft.

As shown in FIG. 2, the set (indicated with 5) of the manoeuvres that can be carried out by an aircraft can be subdivided into a plurality of subsets, to which in the continuation reference is made as to macrocategories (indicated with MC). Each macrocategory MC groups subclasses of manoeuvres (indicated with SC in FIG. 2) with similar features. For example, FIG. 2 shows macrocategories MC related, respectively, to the level flight, to the bank turn, to the vertical take-off, to the climbing, etc. In turn, the macrocategory relative to the level flight may include a plurality of manoeuvres (only four shown in FIG. 2, indicated by "forty-node level flight", "sixty-node level flight", "ninety-node level flight" and "one hundred and fifty-node level flight"). In other words, each macrocategory MC represents a corresponding class (or type) of manoeuvres. Moreover, as described in greater detail below, given a macrocategory MC, the manoeuvres belonging to such macrocategory MC can be distinguished from each other in a deterministic manner, for example on the basis of the corresponding trends of one or more primary quantities (for example, on the basis of on average speeds or average roll angle values, etc.)

In the following it is assumed that the macrocategories MC are in a number equal to NUM_MC.

Figure 3:
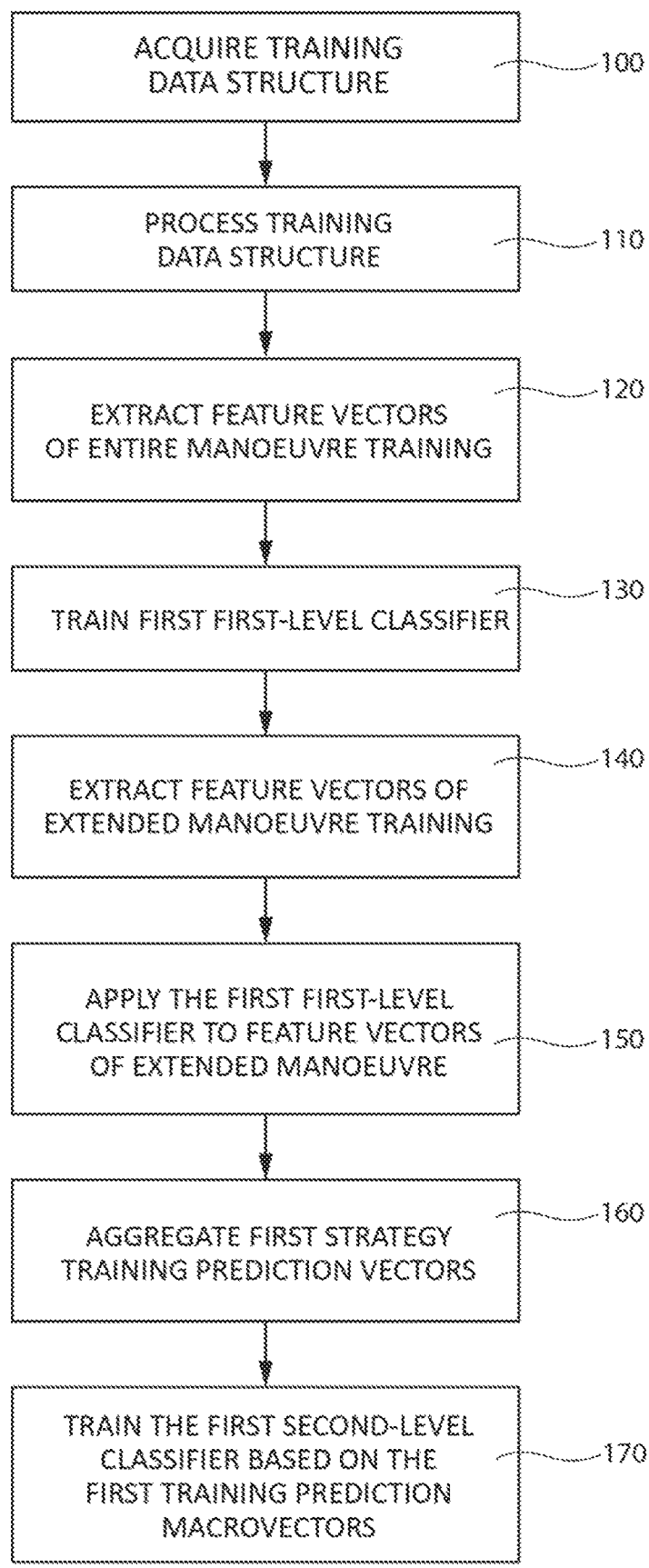
FIGS. 3 and 6 show block diagrams relative to a training step according to a first strategy.
Figure 4:
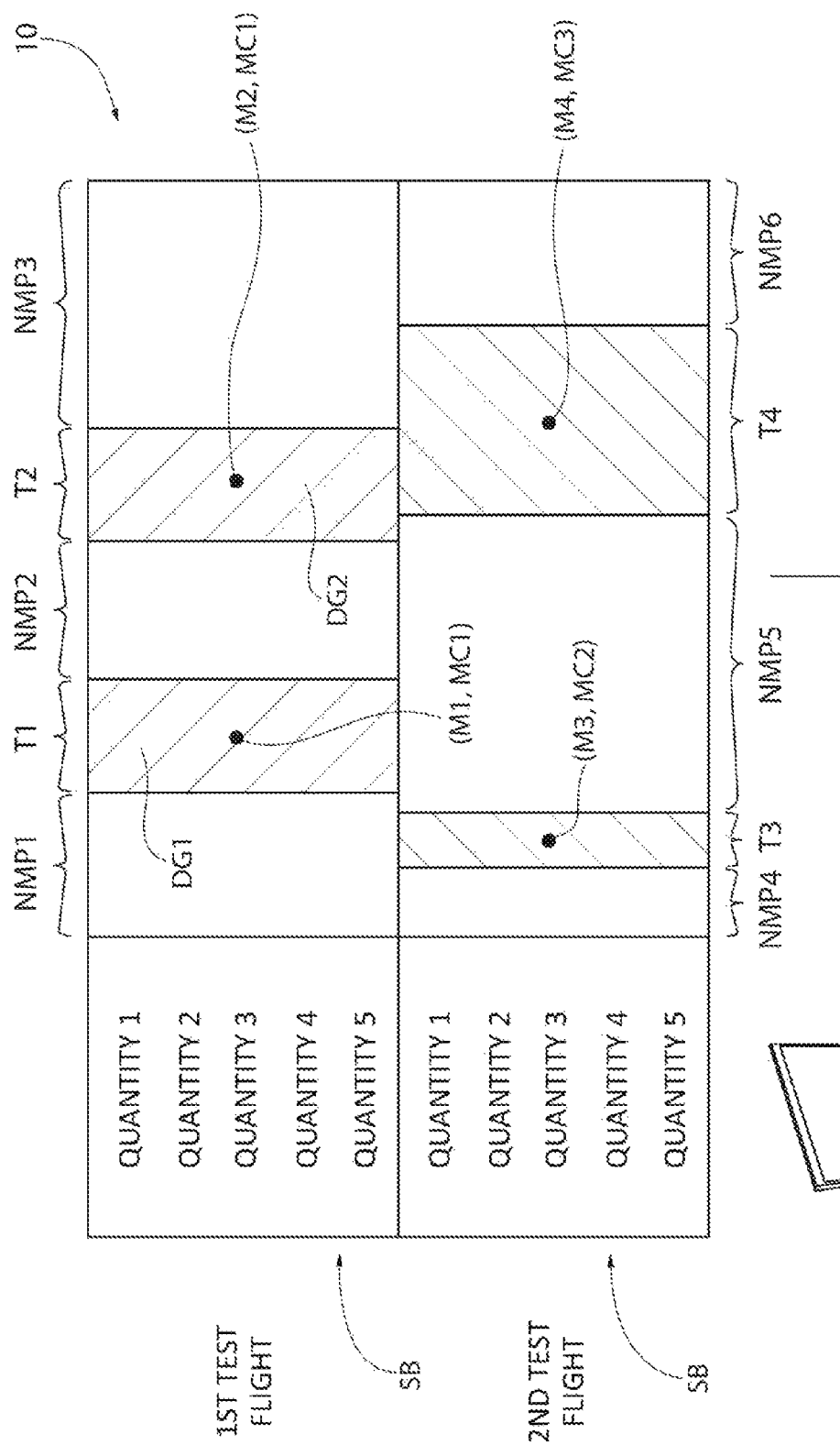
FIG. 4 shows a block diagram of a training data structure.

In consideration of the foregoing, the present method provides, as shown in FIG. 3, for acquiring (block 100) a training data structure 10, an example of which is shown qualitatively in FIG. 4. As shown again in FIG. 4, the training data structure 10 can be stored in a computer 12.

In detail, the training data structure 10 stores the time series (intended as successions of samples connected to corresponding time instants) formed by the values of the primary quantities detected by the monitoring system 2 of the helicopter 1 during test flights, as well as by monitoring systems (not shown) of other aircraft (not shown) during respective test flights. Moreover, as mentioned above with reference to the first and second test manoeuvres M1, M2 shown in FIG. 1B, the training data structure 10 stores the initial instant and the end instant of each test manoeuvre, signalled by the aircraft pilot. In addition, the training data structure 10 stores, for each test manoeuvre, the macrocategory MC to which the test manoeuvre belongs.

For example, assuming that the first and second manoeuvre M1 and M2 belong to the same macrocategory MC1, the training data structure 10 shown in FIG. 4 stores the values of the primary quantities 1-5 during the first and second time interval T1, T2, in both cases, connecting them to the macrocategory MC1. In other words, the training data structure 10 stores a first cluster of data (indicated as DG1 in FIGS. 1B and 4), formed by the values assumed by the quantities 1-5 during the first time interval T1, and a second cluster of data (indicated with DG2 in FIGS. 1B and 4), formed by the values assumed by the quantities 1-5 during the second time interval T2; moreover, either for the first or for the second cluster of data DG1, DG2, the detection data structure 10 stores the connection to the macrocategory MC1. In FIG. 4, the storage of the macrocategories connected to the test manoeuvres is qualitatively represented, by connecting each cluster of data to the corresponding pair (test manoeuvre, macrocategory).

Again with reference to the first test flight, the training data structure 10 also stores the values assumed by the primary quantities 1-5 during the aforementioned non-labelled periods NMP1, NMP2, NMP3, which, as previously mentioned, represent periods in which the pilot has not specified the manoeuvre executed.

Again with reference to the training data structure 10 shown in FIG. 4, it also stores the time series formed by the values of the primary quantities detected by the corresponding sensors during a second test flight, executed for example with an aircraft other than the helicopter 1 with which the first test flight was executed, and in which two other test manoeuvres were signalled, which took place respectively in a third and a fourth time interval T3, T4. In general, the values acquired during each test flight have a respective time axis, with origin coinciding with the start of the flight; the alignment of the time axes of different flights can be managed in a per se known manner and is irrelevant for the purposes of this method. The first and fourth time interval T3, T4 are alternated with other three non-labelled periods NMP4, NMP5, NMP6. In addition, in the third and fourth time interval T3, T4, a third and fourth test manoeuvre have taken place respectively, which belong for example to the macrocategory MC2 and to the macrocategory MC3, respectively.

In practice, the training data structure 10 comprises a number of sub-blocks SB, which are referred to hereinafter as training sub-structures SB. Each training sub-structure SB stores the time series formed by the values assumed of the quantities during a corresponding test flight. Each cluster of data DG therefore belongs to a single corresponding training sub-structure SB.

Again with reference to FIG. 3, the computer 12 processes (block 110) the detection data structure 10, for example so as to remove any abnormal data or incorrectly labelled manoeuvres. Such processing takes place in a per se known manner and is optional; in the following it is assumed, for simplicity's sake, that such processing does not alter the content of the training data structure 10; otherwise, the operations described below are executed on the training data structure processed.

Subsequently, for each test manoeuvre, the computer 12 extracts (block 120) from the training data structure 10 a vector of statistical quantities, which is calculated as described below, in which for simplicity's sake reference is made as to a m-th test manoeuvre $M_m$, which belongs to a macrocategory $MC_m$ and takes place during a time interval $T_m$ of a test flight connected to a m-th training sub-structure $SB_m$. Moreover, it is assumed that the values assumed by the primary quantities during the time interval $T_m$ form a cluster of data $DG_m$. In consideration of the foregoing, the computer 12 extracts, on the basis of the cluster of data $DG_m$, a vector, to which reference is made hereinafter as to the feature vector of entire manoeuvre training $FV_m$.

Figure 5A:
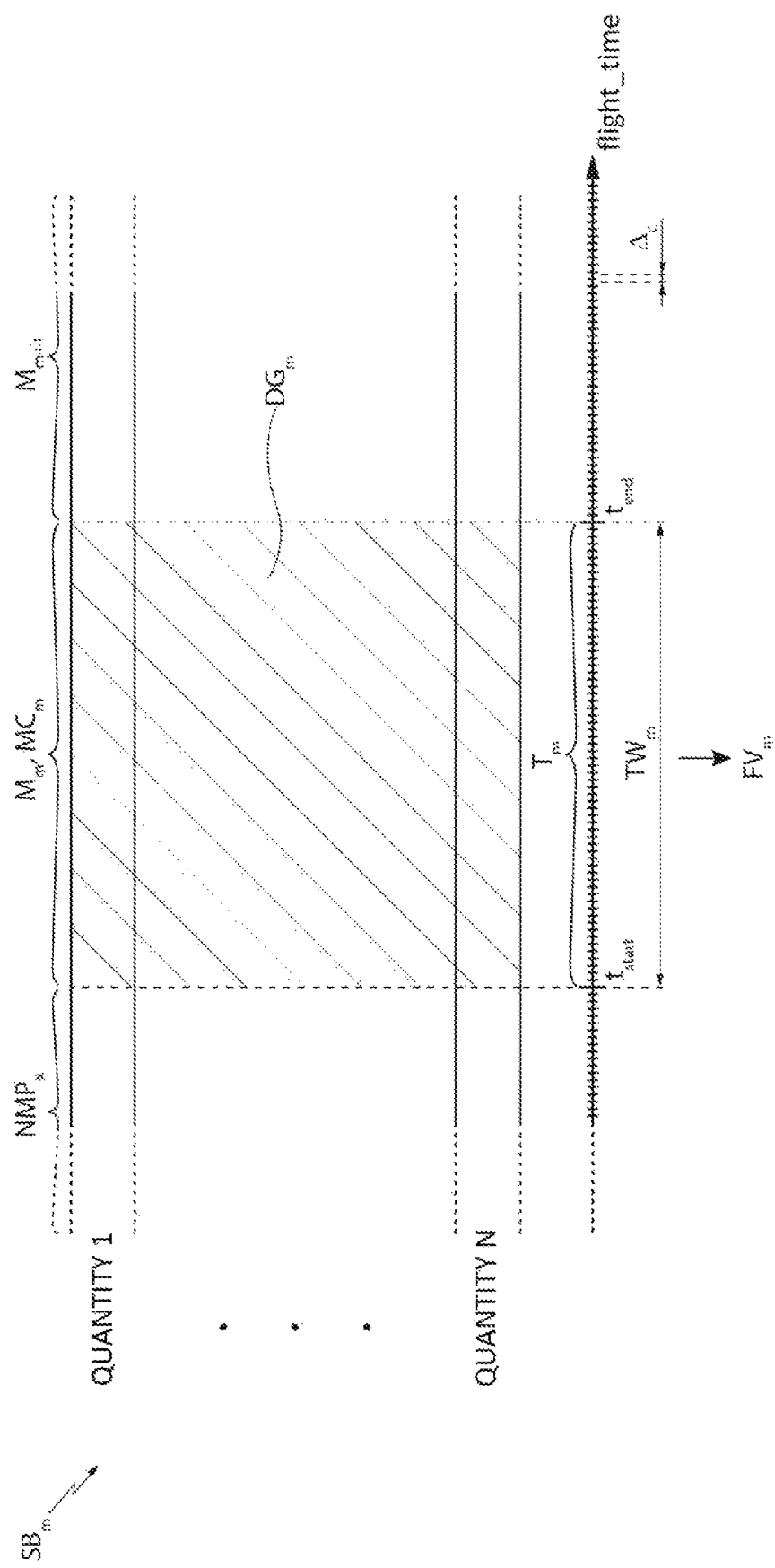
FIG. 5A schematically shows a part of the training data structure and the arrangement of a time window.

In particular, the feature vector of entire manoeuvre training $FV_m$ is calculated as shown in FIG. 5A, i.e. on the basis of the entire cluster of data $DG_m$. In other words, the computer 12 adopts a first type of time window $TW_m$, which coincides with the time interval $T_m$, and therefore with the duration of the test manoeuvre $M_m$. For example, the time interval $T_m$ extends between an instant $t_{start}$ and an instant $t_{end}$, which refer to a time indicated as flight_time, which has a discretization equal to the inverse of the sampling frequency $f_c$, i.e. equal to the sampling period, hereinafter indicated with $\Delta_c$ (shown qualitatively in FIG. 5A).

In greater detail, the feature vector of entire manoeuvre training $FV_m$ is formed by a number of elements, each of which is equal to the value of a statistical quantity calculated on the basis of the values assumed in the time window $TW_m$ (and therefore, during the entire test manoeuvre $M_m$) by a corresponding primary quantity. Purely by way of example, the feature vector of entire manoeuvre training $FV_m$ may be formed by NUM_Ftot=NUM_F*N elements (with integer NUM_F), in which case it occurs that, for example, the first N elements of the feature vector of entire manoeuvre training $FV_m$ are respectively equal to (for example) time averages of the values assumed, respectively, by the primary quantities during the time window $TW_m$, while the second N elements of the feature vector of entire manoeuvre training $FV_m$ are equal to (for example) variances of the values assumed, respectively, by the primary quantities during time window $TW_m$, and so on. For example, in addition to the means and the variances, other statistical quantities can be calculated, such as for example: maximum, minimum, median, mean of the first derivative, mean of the second derivative, angular coefficient of the trend line, etc. As explained, the statistical quantities are calculated over the entire duration of the manoeuvre $M_m$. Moreover, the feature vector of entire manoeuvre training $FV_m$ is connected to the macrocategory $MC_m$ of the corresponding test manoeuvre $M_m$ to which the vector refers, as shown qualitatively in FIG. 5A.

In practice, assuming for example that a number NUM_M of test manoeuvres has been executed, the operations of block 120 allow to generate a number equal to NUM_M of feature vectors of entire manoeuvre training FV, each of which is connected to the corresponding macrocategory MC to which the test manoeuvre refers.

Then, the computer 12 trains (block 130) a classifier 131 (shown in FIG. 7), to which reference is made hereinafter as to the first first-level classifier 131, on the basis of the feature vectors of entire manoeuvre training FV and of the macrocategories MC connected to the latter, as determined for test manoeuvres. In other words, the computer 12 executes a supervised and multi-class training; moreover, the first first-level classifier 131 is a type known per se, such as for example a random forest classifier.

Then, the computer 12 extracts (block 140), for each test manoeuvre, a number of further feature vectors, to which reference is made hereinafter as to the feature vectors of extended manoeuvre training $FV'_{mpj}$, in which the index 'm' indexes the test manoeuvres, while the indexes 'p' and 'j' are explained below. Moreover, the computer 12 uses a number NUM_TW of time durations TW' (for example, NUM_TW=4), which are shared among all the test manoeuvres, that is, they do not vary with the variation of the test manoeuvre considered.

Figure 6:
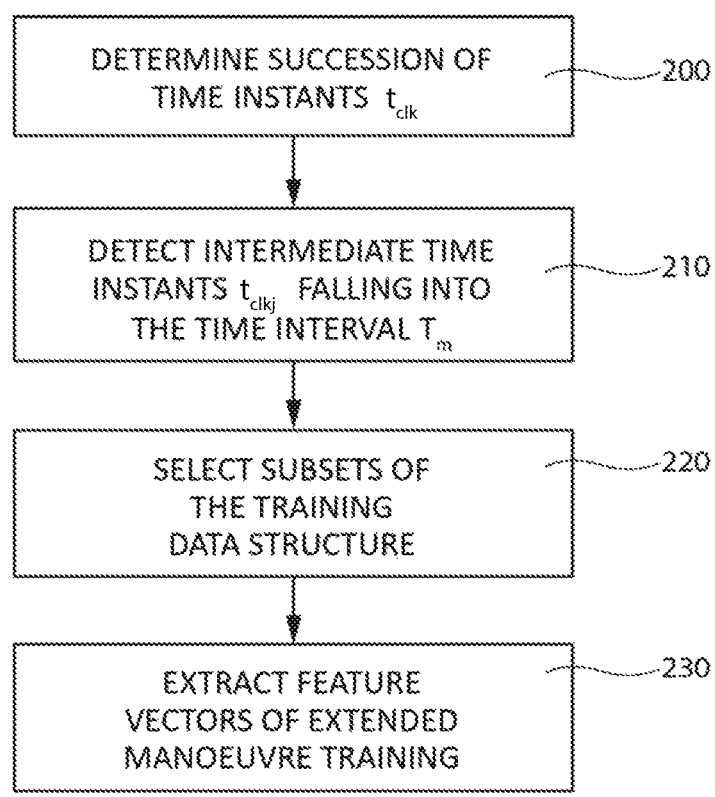

In detail, for each test manoeuvre, the computer 12 executes the operations mentioned in FIG. 6 and shown in FIG. 5B, the latter figure referring again to the aforementioned m-th test manoeuvre $M_m$ and to a first time duration $TW'_1$.

In greater detail, the computer 12 has its own time base (indicated by time_clk) with period $\Delta_{clk}$, on the basis of which the computer 12 determines (block 200, FIG. 6) a succession of time instants $t_{clk}$ (shown in FIG. 5B). For example, the period $\Delta_{clk}$ is equal to a multiple of the sampling period $\Delta_c$; for example, the period $\Delta_{clk}$ is equal to twenty-five times the sampling period $\Delta_c$.

Moreover, the computer 12 detects (block 210) the time instants $t_{clkj}$ falling in the time interval $T_m$, and thus falling during the test manoeuvre $M_m$. For example, in FIG. 5B, it is shown j=0, . . . , 4. Hereinafter, for brevity's sake, reference is made to the aforementioned time instants $t_{clkj}$ falling in the time interval $T_m$ as to the intermediate time instants $t_{clkj}$; furthermore, reference is made to NUM_J to indicate the number of intermediate time instants $t_{clkj}$, said number being a function of the time interval $T_m$ and of the period $\Delta_{clk}$ and being independent of the time duration TW' considered. For example, in FIG. 5B, it is shown NUM J=5. The value NUM_J depends on the duration of the test manoeuvre considered and the alignment thereof with time_clk.

Subsequently, for each time duration $TW'_p$ (with p=1, . . . NUM_TW, used to index the time duration TW'), the computer 12 selects (block 220), for each intermediate time instant $t_{clkj}$, the subset of the values of the m-th training sub-structure $Sbm_m$ falling into the time window between $t_{clkj}-(TW'_p/2)$ and $t_{clkj}+(TW'_p/2)$. In other words, each time duration $TW'_p$ identifies a corresponding time window of equal duration, which is translated and centred (i.e. aligned) in each of the intermediate time instants $t_{clkj}$, so as to select the values of the training sub-structure SB relating to the test manoeuvre considered which fall into said translated time window. As can be noted in FIG. 5B, it is possible that, depending on the intermediate time instant $t_{clkj}$ and on the time duration TW' considered, the corresponding subset of selected values of the training sub-structure SB includes portions of time series of the primary quantities adjacent to the time interval in which the test manoeuvre considered has taken place, that is, it includes values assumed by the primary quantities in a waiting period preceding/following the test manoeuvre or during a test manoeuvre preceding/following the test manoeuvre considered. Purely by way of example, in FIG. 5B it has been assumed that the m-th test manoeuvre $M_m$ is preceded by a non-labelled period $NMP_x$ and is immediately followed by an m+1-th test manoeuvre $M_{m+1}$. Moreover, when the time window with extension equal to the first time duration $TW'_1$ is aligned (centred) with the intermediate time instant $t_{clk0}$ or with the intermediate time instant $t_{clk1}$, it occurs that the corresponding subset of selected values of the training sub-structure $SB_m$ also includes values assumed by the primary quantities during part of the previous non-labelled period $NMP_x$. Moreover, when the time window with extension equal to the first time duration $TW'_1$ is centred at the intermediate time instant $t_{clk3}$ or at the intermediate time instant $t_{clk4}$, it occurs that the corresponding subset of selected values of the training sub-structure $SB_m$ also includes values assumed by the primary quantities during part of the subsequent test manoeuvre $M_{m+1}$.

Subsequently, on the basis of each selected subset of the values of the training sub-structure $SB_m$, the computer 12 extracts (block 230) a corresponding feature vector of extended manoeuvre training $FV'_{mpj}$. Consequently, for each test manoeuvre, NUM_TW*NUM_J feature vectors of extended manoeuvre training $FV'_{mpj}$ are calculated, all of which are connected to the macrocategory $MC_m$ of the corresponding test manoeuvre $M_m$.

The feature vectors of extended manoeuvre training $FV'_{mpj}$ have the same dimensions as the feature vectors of entire manoeuvre training $FV_m$ and are calculated in the same way, i.e. they refer to the same statistical quantities, however, these statistical quantities are calculated on the basis of subsets of the values assumed by the primary quantities during each test manoeuvre, instead of on the basis of the values assumed by the primary quantities during the entire test manoeuvre. In particular, each element of each feature vector of extended manoeuvre training $FV'_{mpj}$ is equal to the value of a corresponding statistical quantity calculated on the basis of the values assumed by a corresponding primary quantity during the time window $t_{clkj}-(TW'_p/2)$ and $t_{clkj}+(TW'_p/2)$.

By way of example, FIG. 5C again relates to the m-th test manoeuvre $M_m$ and shows the selection of the subsets of the training sub-structure $SB_m$, relating to the second time duration $TW'_2$, which for example has a duration twice the first time duration $TW'_1$. This selection allows to calculate the five feature vectors of extended manoeuvre training $FV'_{m20}$-$FV'_{m24}$, which, like the feature vectors of extended manoeuvre training $FV'_{m10}$-$FV'_{m14}$ shown in FIG. 5B, are connected to the macrocategory $MC_m$ of the m-th test manoeuvre $M_m$.

Again with reference to FIG. 3, for each test manoeuvre, the computer 12 applies (block 150), for each of the corresponding intermediate time instants $t_{clk}j$, the first first-level classifier 131 to each of the feature vectors of extended manoeuvre training $FV'_{mpj}$, so as to obtain a number equal to NUM_TW of first strategy training prediction vectors $PV'_{mpj}$, which can be indexed in the same way as the feature vectors of extended manoeuvre training $FV'_{mpj}$.

Each first strategy training prediction vector $PV'_{mpj}$ has a number of elements equal to the number NUM_MC of macrocategories MC, each element being indicative of the probability that the corresponding feature vector of extended manoeuvre training $FV'_{mpj}$ is connected to the macrocategory MC that corresponds to the element.

Moreover, for each test manoeuvre, the computer 12 aggregates (block 160), for each of the intermediate time instants $t_{clkj}$, the first strategy training prediction vectors $PV'_{mpj}$ (in a number equal to NUM_TW), so as to form a corresponding macrovector, which is still connected to the macrocategory MC of the test manoeuvre, and to which reference is made hereinafter as to the corresponding first training prediction macrovector $MPV'_m j$.

Figure 7:
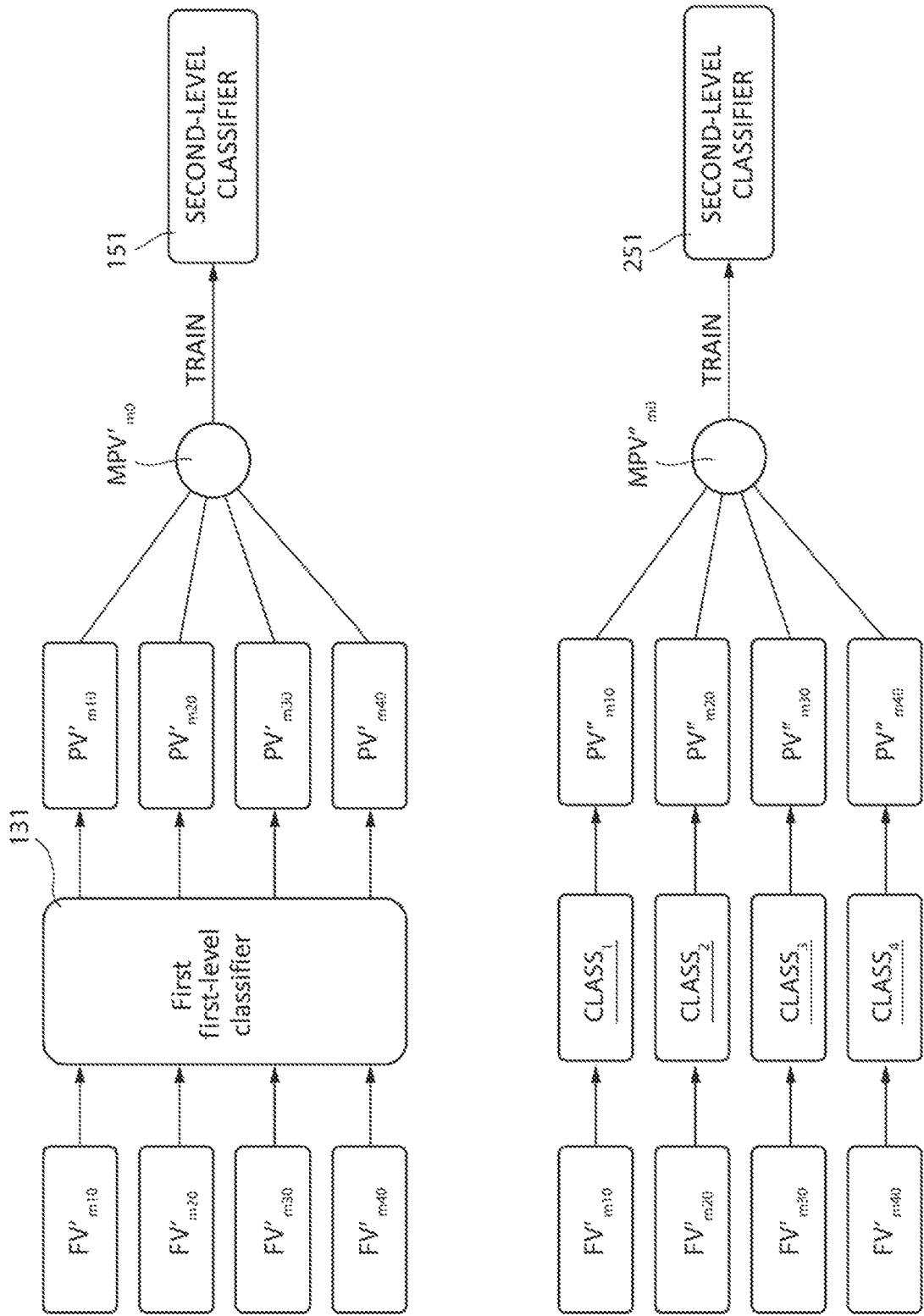
FIG. 7 shows two block diagrams exemplifying training operations according to the first strategy and according to a second strategy.

For example, FIG. 7 refers to the m-th test manoeuvre $M_m$ and shows a graphical example of the operations of blocks 150 and 160, with reference to a single intermediate time instant $t_{clkj}$ (in the example shown, the intermediate time instant $t_{clk0}$). In particular, FIG. 7 shows how the application of the first first-level classifier 131 to the four feature vectors of extended manoeuvre training $FV'_{m10}$-$FV'_{m40}$ leads to the generation, respectively, of the corresponding four first strategy training prediction vectors $PV'_{m10}$-$PV'_{m40}$, which are aggregated into the first training prediction macrovector $MPV'_{m0}$, which is connected to the macrocategory $MC_m$ of the test manoeuvre $M_m$.

Figure 8:
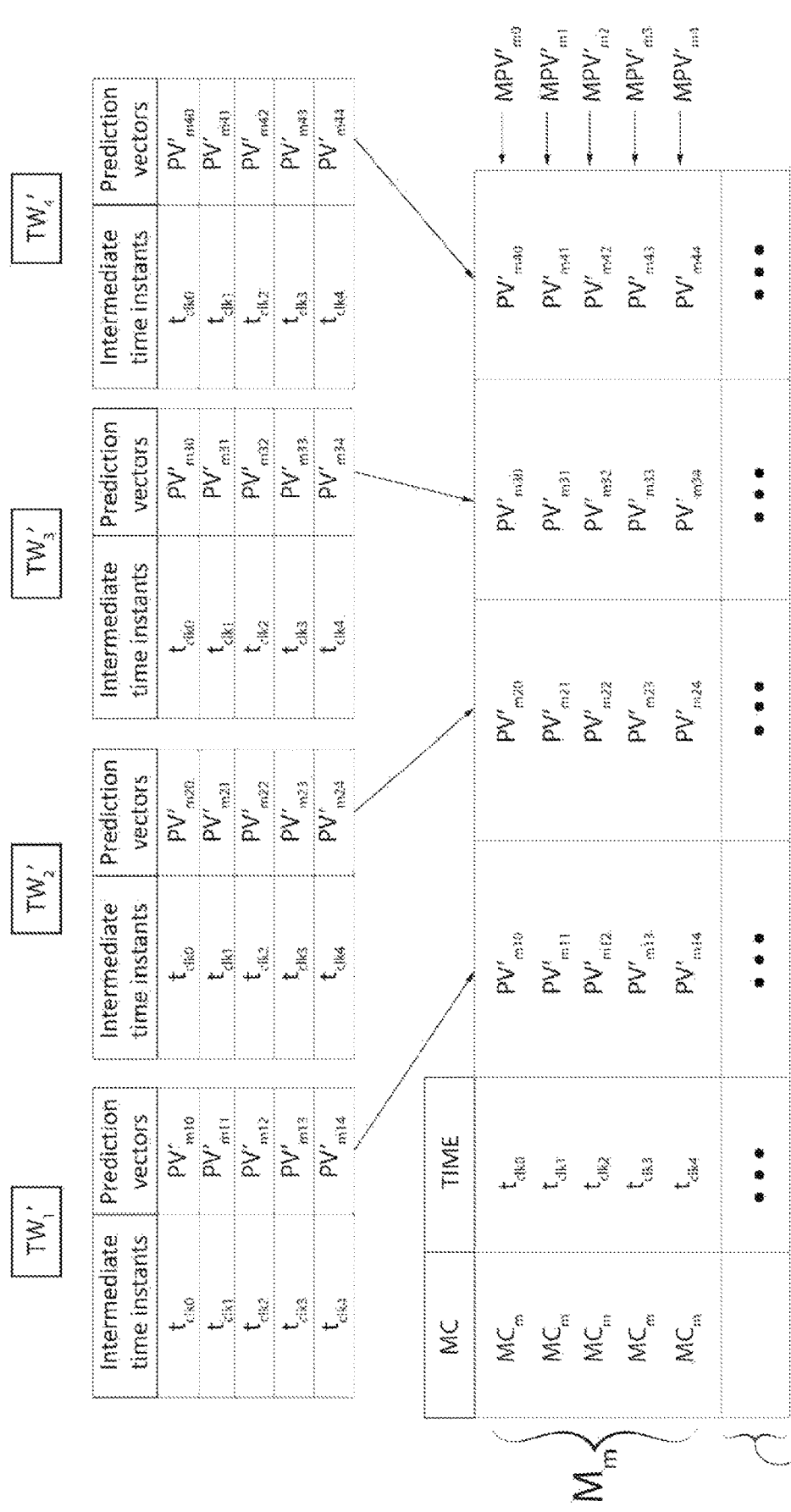
FIG. 8 shows tables exemplifying part of the operations shown in FIG. 3.

In addition, FIG. 8 refers to the m-th test manoeuvre $M_m$ and shows how, for each of the four time durations $TW'_1$-$TW'_4$, each of the five intermediate time instants $t_{clk0}$-$t_{clk4}$ is connected to a corresponding first strategy training prediction vector PV', each of which, as said, includes a number of elements equal to the number NUM_MC of macrocategories. Moreover, FIG. 8 shows that each of the five intermediate time instants $t_{clk0}$-$t_{clk4}$ is connected to a corresponding first training prediction macrovector $MPV'_{m0}$-$MPV'_{m4}$, which is also connected to the macrocategory $MC_m$.

Again with reference to FIG. 3, after executing the operations of block 160, the computer 12 trains (block 170) a first second-level classifier 151 (shown in FIG. 7), on the basis of the first training prediction macrovectors $MPV'_{mj}$ calculated for the test manoeuvres, as well as on the basis of the macrocategories MC connected to said macrovectors.

In practice, the first second-level classifier 151 is trained in a supervised manner. Furthermore, purely by way of example, the first second-level classifier 151 may be a classifier of the logistic regression type.

Figure 9:
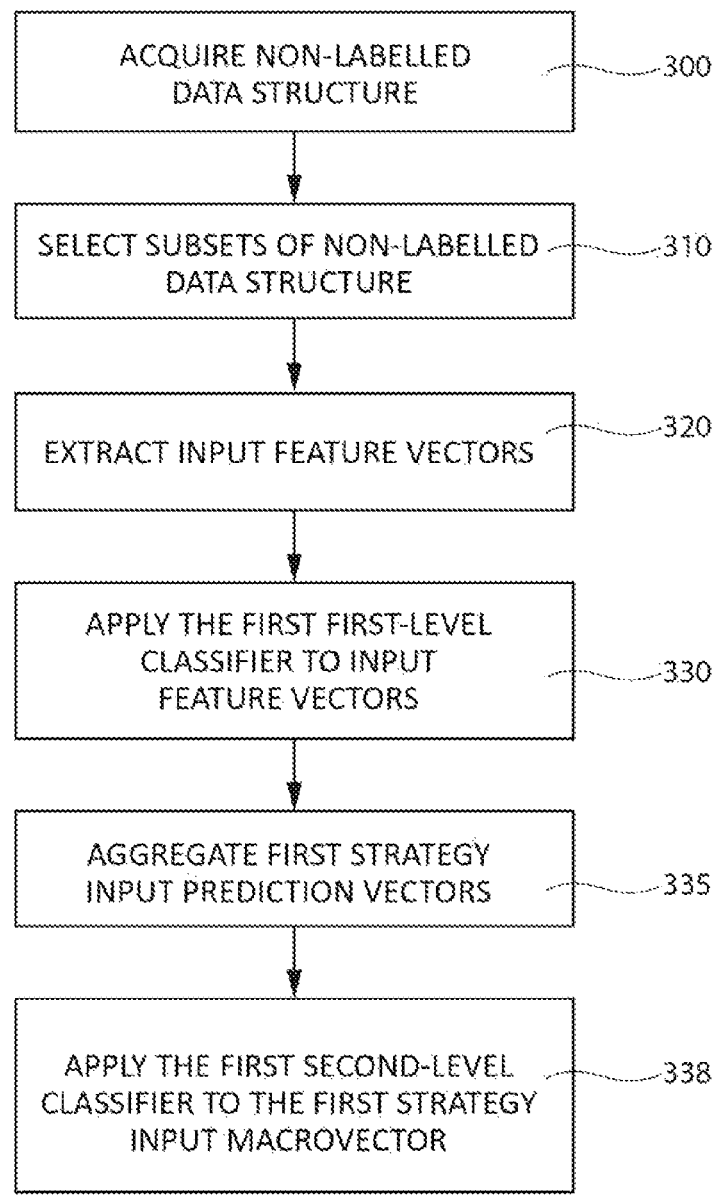
FIG. 9 shows a block diagram relative to analysis operations according to the first strategy.

Once the first first-level classifier 131 and the first second-level classifier 151 have been trained, it is possible to determine the macrocategory to which an unknown manoeuvre (therefore, with unknown duration) belongs, executed, for example, by an unknown helicopter 3 (an example of which is shown in FIG. 1A), equipped with a respective monitoring system 4 including sensors (not shown) suitable for monitoring the aforementioned primary quantities. More precisely, during an unknown flight of the unknown helicopter 3, that is, during a flight in which the executed manoeuvres are not known, it is possible to identify the occurrence of a manoeuvre belonging to one of the aforementioned macrocategories MC, used during the training of the first first-level classifier 131 and of the first second-level classifier 151. For this purpose, the operations shown in FIG. 9 are executed.

Figure 10:
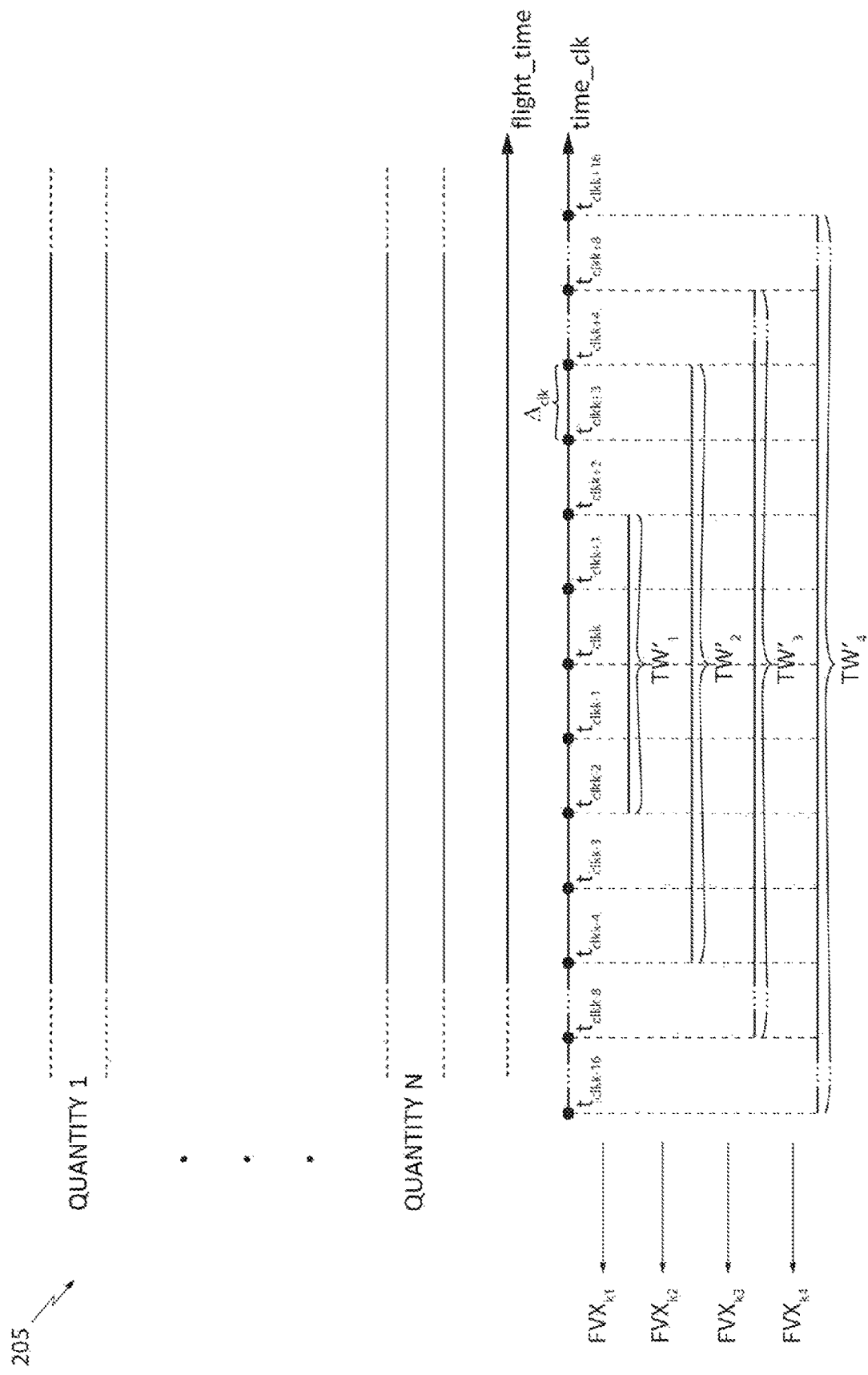
FIG. 10 schematically shows a part of a non-labelled data structure and the arrangement of windows having different time durations.

In detail, a new data structure (shown in FIG. 10, where it is indicated by 205) is acquired (block 300), to which reference is made hereinafter as to the non-labelled data structure 205, since it is formed by the time series of the values assumed by the primary quantities, as measured by the monitoring system 4 equipping the unknown helicopter 3 during the unknown flight. In practice, the non-labelled data structure 205 is formed by a single training substructure SB. Furthermore, since the manoeuvres executed during the unknown flight are unknown, the non-labelled data structure 205 does not store any connection to the macrocategories MC.

Like in the case of the training data structure 10, also in the non-labelled data structure 205 the values of each primary quantity are connected to the corresponding sampling instants, i.e. they are distributed along the aforementioned flight_time, which has a discretization still equal to the sampling period $\Delta_c$. In practice, by assuming that the unknown flight extends along a time interval $W_{tot}$, to which reference is made hereinafter as to the total time interval $W_{tot}$, each time series connected to a corresponding primary quantity includes a number of values equal to $W_{tot}*f_c$.

The computer 12 still has the time base time_clk, with period $\Delta_{clk}$, which generates the time instants t_clk. Furthermore, given a generic k-th time instant $t_{clkk}$ (shown in FIG. 10), the computer 12 selects (block 310) a number equal to NUM_TW of subsets of values of the non-labelled data structure 205. In particular, for each of the time durations $TW'_p$ (with p=1, ... NUM_TW), the computer 12 selects the subset of the values of the non-labelled data structure 205 that fall into the time window ranging between $t_{clkk}-(TW'_p/2)$ and $t_{clkk}+(TW'_p/2)$. If the time window ranging between $t_{clkk}-(TW'_{NUM\_TW}/2)$ and $t_{clkk}+(TW'_{NUM\_TW}/2)$ (that is, the broadest time window) extends beyond the boundaries of the non-labelled data structure 205, it is possible to adopt a different centring of the NUM_TW time windows with respect to the time instant $t_{clkk}$, so that the time windows fall entirely into the non-labelled data structure 205, or the time instant $t_{clkk}$ can be discarded, or also the corresponding subsets of the non-labelled data structure 205 may include only the values actually available; these details are irrelevant for the purposes of executing this method.

Then, for each selected subset of the values of the non-labelled data structure 205, the computer 12 extracts (block 320) a corresponding vector of features, which is referred to hereinafter as to the input feature vector $FVX_{kp}$. Consequently, for the generic k-th time instant $t_{clkk}$ provided by the time base time_clk, a number equal to NUM_TW of input feature vectors $FVX_{kp}$, without any connections to any macrocategory MC, are calculated.

The input feature vectors $FVX_{kp}$ have the same dimensions as the feature vectors of extended manoeuvre training $FV'_{mpj}$ and of the feature vectors of entire manoeuvre training $FV_m$ and are calculated in the same way, i.e. they refer to the same statistical quantities, however, these statistical quantities are calculated on the basis of subsets of the values assumed by the primary quantities during the unknown flight. In particular, each element of the input feature vector $FVX_{kp}$ is equal to the value of a corresponding statistical quantity calculated on the basis of the values assumed by a corresponding primary quantity in the time window $t_{clkk}-(TW'_p/2)$ and $t_{clkk}+(TW'_p/2)$.

Figure 11:
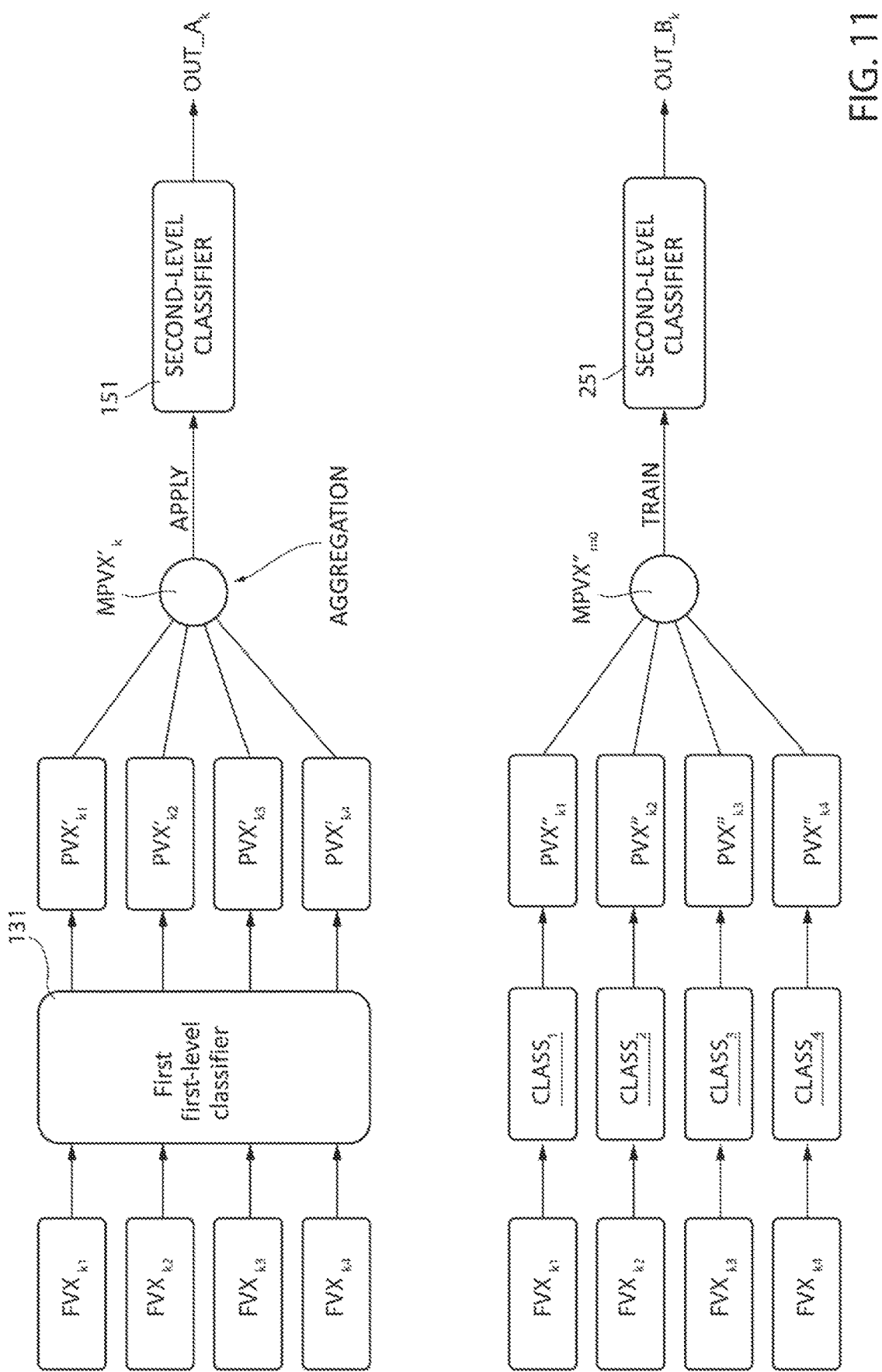
FIG. 11 shows two block diagrams exemplifying analysis operations according to the first and second strategy.

Then, referring for example to the generic k-th time instant $t_{clkk}$, the computer 12 applies (block 330) the first first-level classifier 131 to the corresponding input feature vectors $FVX_{kp}$, so as to obtain a number equal to NUM_TW of first strategy input prediction vectors $PVX'_{kp}$, as qualitatively exemplified in FIG. 11, in which the four first strategy input prediction vectors $PVX'_{k1}$-$PVX'_{k4}$ are shown, which derive from the application of the first first-level classifier 131 to, respectively, the four input feature vectors $FVX_{k1}$-$FVX_{k4}$.

Each first strategy input prediction vector $PVX'_{kp}$ has a number of elements equal to the number NUM_MC of macrocategories MC, each element being indicative of the probability that the corresponding input feature vector $FVX_{kp}$ is connected to the macrocategory MC that corresponds to the element, and therefore of the probability that at the corresponding k-th time instant $t_{clkk}$ the unknown helicopter 3 was executing a manoeuvre belonging to such macrocategory MC.

Again with reference to the k-th time instant $t_{clkk}$, the computer 12 aggregates (block 335) the first strategy input prediction vectors $PVX'_{kp}$ (in a number equal to NUM_TW), so as to form a corresponding macrovector, to which reference is made hereinafter as to the first strategy input macrovector $MPVX'_k$.

Again with reference to the k-th time instant $t_{clkk}$, the computer 12 then applies (block 338) the first second-level classifier 151 to the first strategy input macrovector $MPVX'_k$, so as to obtain a first output vector $OUT\_A_k$, which has a number of elements equal to the number NUM_MC of macrocategories, each element being indicative of the probability that the corresponding input feature vector $FVX_{kp}$ is connected to the macrocategory MC that corresponds to the element, and therefore the probability that, at the k-th time instant $t_{clkk}$, the unknown helicopter 3 was executing a manoeuvre belonging to this macrocategory MC. In practice, the first output vector $OUT\_A_k$ represents an improvement of the probabilities contained in the first strategy input prediction vectors $PVX'_{kp}$, as explained below with reference to all the mentioned second-level classifiers.

Figure 12:
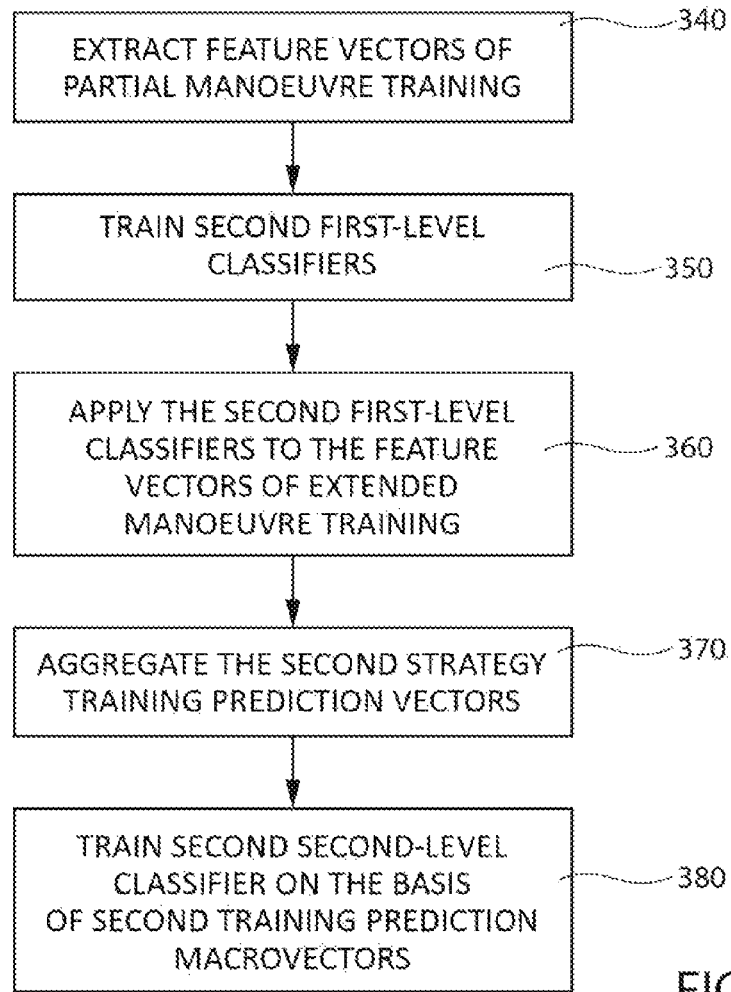
FIGS. 12 and 13 show block diagrams relative to a training step according to the second strategy.

Alternatively or in addition to what has been described so far, the computer 12 may implement a different strategy, which is now described with reference to FIG. 12 and provides for training, starting from the training data structure 10, a plurality of second first-level classifiers CLASS and a second one 251, as qualitatively shown in FIG. 7. What has been said above as regards to blocks 100 and 110 of FIG. 3 also applies to this strategy.

Figure 13:
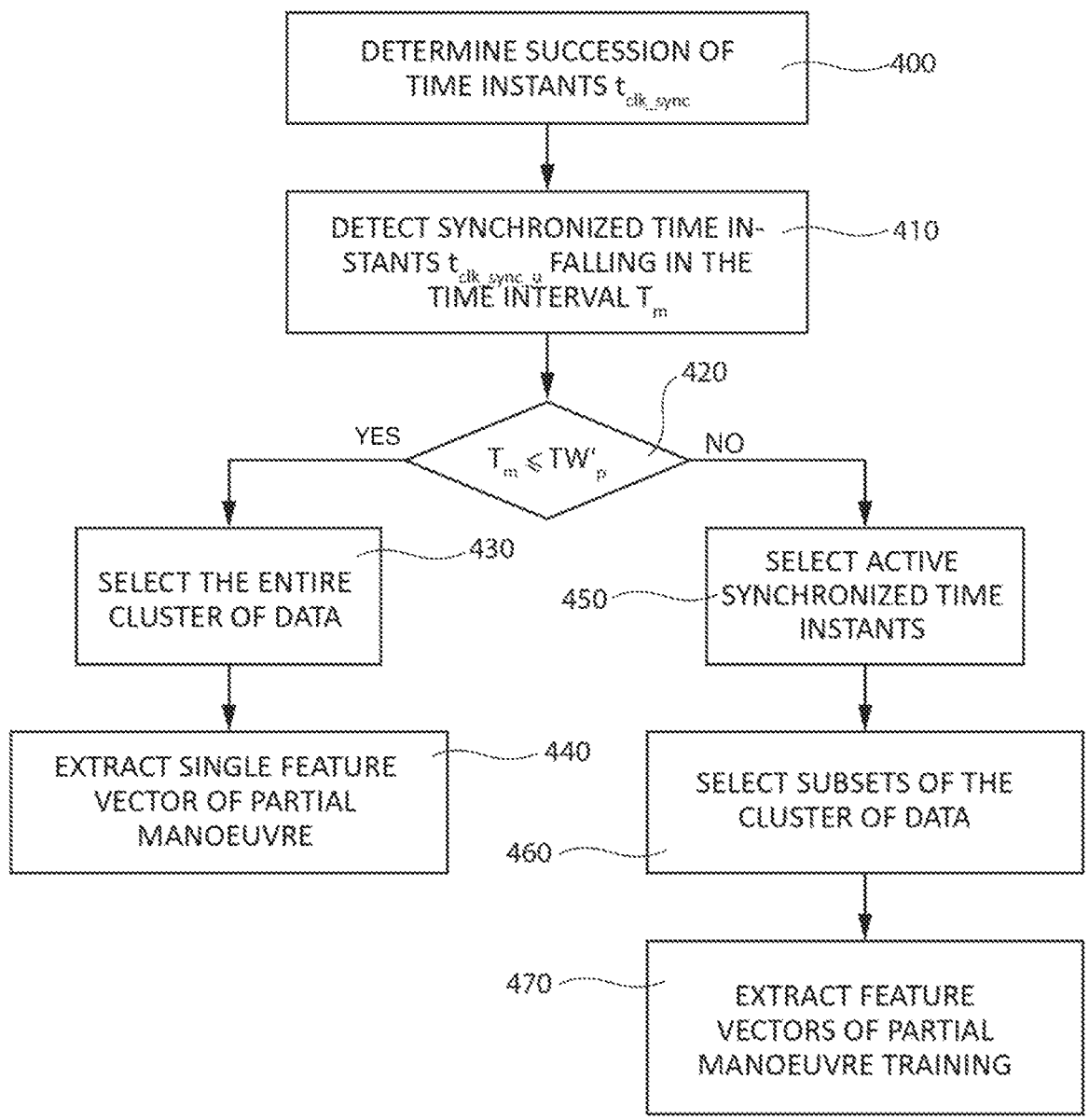
Figure 14:
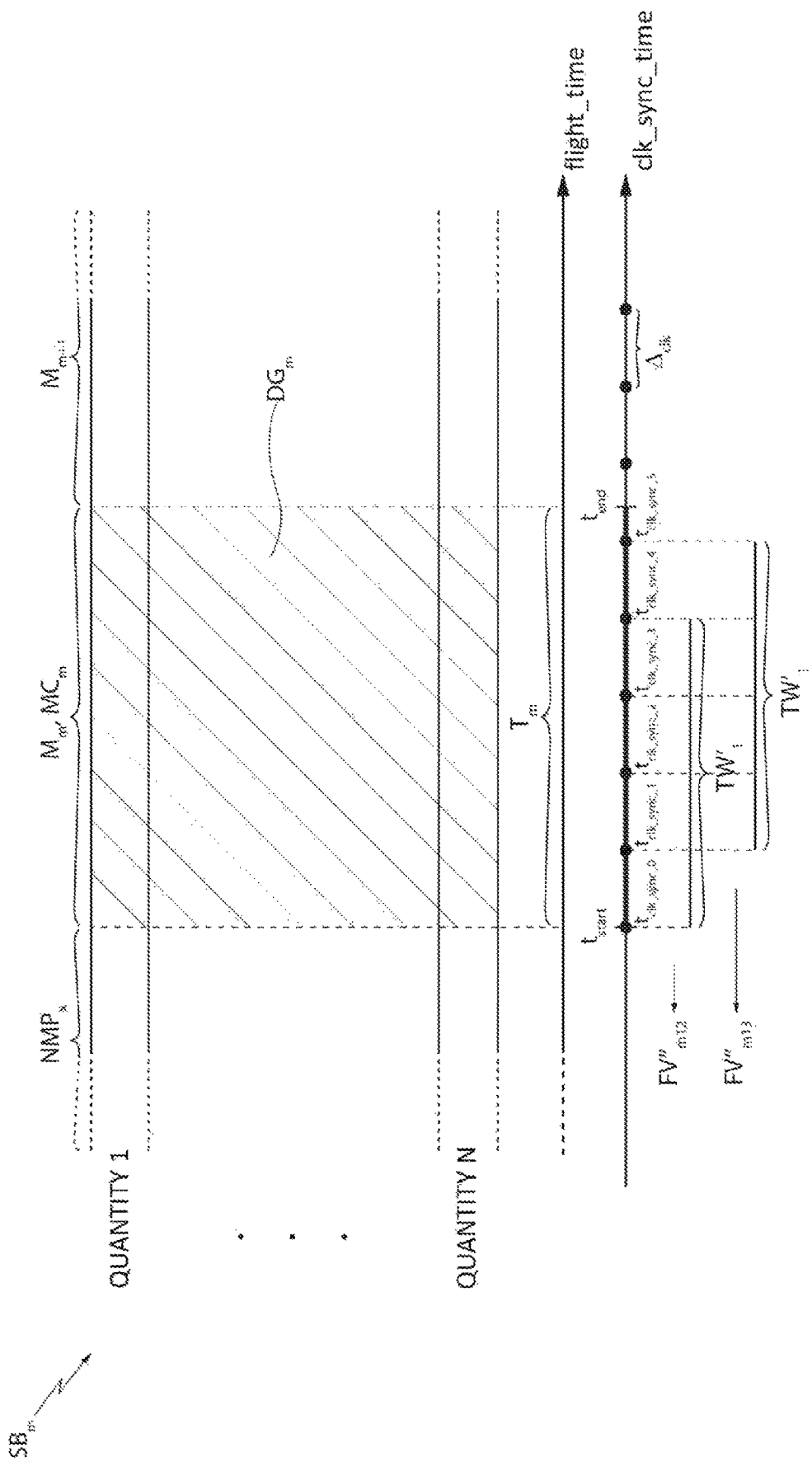
FIG. 14 schematically shows the part of the training data structure shown in FIGS. 5A-5C and the arrangement of time windows used during training according to the second strategy.

Initially, for each test manoeuvre, the computer 12 extracts (block 340, FIG. 12) a number of feature vectors, to which reference is made hereinafter as to the feature vectors of partial manoeuvre training FV"; to this end, the computer 12 executes the operations described in FIG. 13 and exemplified in FIG. 14, the latter figure referring again to the aforementioned m-th test manoeuvre $M_m$, which, as explained above, extends between the instant $t_{start}$ and the instant $t_{end}$, which are referred to as flight_time.

In greater detail, the computer 12 makes use of a synchronized time base, to which reference is made hereinafter as to time_clk_sync, since it has a period equal to the period $\Delta_{clk}$ and is synchronized with respect to the instant $t_{start}$, so as to have origin coinciding with the instant $t_{start}$. In other words, the computer 12 determines (block 400, FIG. 13) a succession of time instants $t_{clk\_sync}$ (shown in FIG. 14).

Moreover, the computer 12 detects (block 410, FIG. 13) the time instants $t_{clk\_sync\_u}$ falling within the time interval $T_m$, and therefore falling during the test manoeuvre $M_m$. For example, in FIG. 14 it is shown u=1, . . . , 5; the time instant $t_{clk\_sync\_0}$ is not detected, since it coincides with the instant $t_{start}$. Hereinafter, for brevity's sake, reference is made to the aforementioned time instants $t_{clk\_sync\_u}$ falling into the time interval $T_m$ as to the synchronized intermediate time instants $t_{clk\_sync\_u}$; furthermore, NUM_U is referred to as to indicate the number of synchronized intermediate time instants $t_{clk\_sync\_u}$, said number NUM_U being a function of the time interval $T_m$ and of the period $\Delta_{clk}$.

Subsequently, for each time duration $TW'_p$ (with p=1, . . . NUM_TW, used to index the time duration TW'), the computer 12 selects, for each test manoeuvre, a number of subsets (possibly also an entire subset, as explained hereinafter) of the cluster of data DG corresponding to the test manoeuvre, as described hereinafter, again with reference to the generic p-th time duration $TW'_p$ and to the m-th test manoeuvre $M_m$, and as shown in FIG. 14 with reference to the first time duration $TW'_1$.

In detail, the computer 12 checks (block 420) whether the time interval $T_m$ in which the m-th test manoeuvre $M_m$ has taken place has a duration lower than or equal to the p-th time duration $TW'_p$, in which case (output YES of block 420) the computer 12 selects (block 430) the entire cluster of data $DG_m$ and then extracts (block 440) from the entire cluster of data $DG_m$ a single feature vector of partial manoeuvre $FV"_{mp0}$, which is equal to the aforementioned feature vector of entire manoeuvre $FV_m$ and is connected to the macrocategory $MC_m$ of the corresponding test manoeuvre $M_m$.

On the contrary, if the time interval $T_m$ in which the m-th test manoeuvre $M_m$ has taken place has a duration greater than the p-th time duration $TW'_p$ (output NO of block 420), the computer 12 selects (block 450) each synchronized intermediate time instant $t_{clk\_sync\_u}$ such that the time window $t_{clk\_sync\_u}-(TW'_p/2)$ and $t_{clk\_sync\_u}-(TW'_p/2)$ falls entirely within the time interval $T_m$. For example, with reference to FIG. 14, it is assumed therein that the first time duration $TW'_1$ is equal to four times the period $\Delta_{clk}$, so the computer 12 only selects the synchronized intermediate time instants $t_{clk\_sync\_2}$ and $t_{clk\_sync\_3}$. In the continuation reference is made to the synchronized intermediate time instants $t_{clk\_sync\_u}$ selected during the operations of block 450 as to the active synchronized time instants; they vary as a function of the time duration $TW'_p$ considered.

Moreover, for each active synchronized intermediate time instant $t_{clk\_sync\_u}$, the computer 12 selects (block 460) the subset of the values of the cluster of data $DG_m$ falling into the time window falling between $t_{clk\_sync\_u}-(TW'_p/2)$ and $t_{clk\_sync\_u}+(TW'_p/2)$. In other words, for each active synchronized intermediate time instant $t_{clk\_sync\_u}$, a time window of duration equal to the time duration $TW'_p$ is centred thereon, this window being used to select the values of the cluster of data $DG_m$.

Subsequently, for each selected subset of the values of the cluster of data $DG_m$, the computer 12 extracts (block 470) a corresponding feature vector of partial manoeuvre training $FV"_{mpu}$, which is connected to the macrocategory $MC_m$ of the corresponding test manoeuvre $M_m$, has the same dimensions as the feature vectors of extended manoeuvre training $FV'_{mpj}$ and is calculated in the same way, i.e. it refers to the same statistical quantities, which are calculated on the basis of a subset which includes the values assumed by the primary quantities during a subportion of the test manoeuvre. By way of example, the two feature vectors of partial manoeuvre training $FV"_{m12}$ and $FV"_{m13}$ are indicated in FIG. 14.

Again with reference to FIG. 12, at the end of the operations in block 340, the computer 12 has, for each of the time durations TW', a corresponding set of feature vectors of partial manoeuvre training $FV"_{mpu}$. For example, considering the p-th time duration $TW'_p$, the computer 12 has a set $SET_p$ which includes, for each test manoeuvre, a corresponding subset of feature vectors of partial manoeuvre training $FV"_{mpu}$; the latter subset includes, in the case of a test manoeuvre with duration lower than the time duration $TW'_p$, the only feature vector of partial manoeuvre $FV"_{mp0}$ (equal to the corresponding feature vector of entire manoeuvre $FV_m$), otherwise it includes a number of feature vectors of partial manoeuvre training $FV"_{mpu}$ which depends on the duration of the test manoeuvre and on the time duration $TW'_p$. In any case, given the p-th time duration $TW'_p$, the corresponding set $SET_p$ of feature vectors of partial manoeuvre training $FV"_{mpu}$ contains feature vectors calculated on the basis of portions of the corresponding clusters of data DG which have extensions not higher than the same time duration $TW'_p$.

By way of example, FIG. 15 shows the set (indicated as $SET_1$) of feature vectors of partial manoeuvre training relating to the first time duration $TW'_1$, the subset of which (indicated as $mSET_1$) relating to the m-th manoeuvre $M_m$ is formed by the aforementioned two feature vectors of partial manoeuvre training $FV"_{m12}$ and $FV"_{m13}$, which refer respectively to the active synchronized intermediate time instants $t_{clk\_sync\_2}$ and $t_{clk\_sync\_3}$.

In consideration of the foregoing and again with reference to FIG. 12, for each time duration TW', the computer 12 trains (block 350) a corresponding second first-level classifier CLASS, on the basis of the corresponding set SET of feature vectors of partial manoeuvre training $FV"_{mpu}$ and of the macrocategories MC connected to these vectors. In other words, the computer 12 executes trainings of the supervised and multiclass type, so as to obtain a number of second first-level classifiers equal to NUM_TW, as shown qualitatively in FIG. 7, in which four second first-level classifiers $CLASS_1$-$CLASS_4$ are shown, which correspond respectively to the time durations $TW_1'$-$TW_4'$.

The second first-level classifiers CLASS are of a type known per se, such as for example random forest classifiers. Moreover, as stated above, referring for example to the p-th second first-level classifier $CLASS_p$, it has been trained on the basis of feature vectors calculated on portions of clusters of data DG relating to test manoeuvres, said portions having time extensions not higher than the p-th time duration $TW'_p$.

Once the second first-level classifiers CLASS have been trained, the computer 12 applies (block 360) the second first-level classifiers CLASS to the aforementioned feature vectors of extended manoeuvre training $FV'_{mpj}$, in the following manner.

In detail, for each test manoeuvre, and for each of the corresponding intermediate time instants $t_{clk}j$, the computer 12 applies the p-th second first-level classifier $CLASS_p$(with p=1, . . . , NUM_TW) to the corresponding feature vector of extended manoeuvre training $FV'_{mpj}$, that is, to the feature vector of extended manoeuvre training $FV'_{mpj}$ obtained by applying a time window having a duration equal to the time duration $TW'_p$, that is equal to the duration of the time window used to train the same second first-level classifier $CLASS_p$, and it obtains a corresponding second strategy training prediction vector $PV''_{mpj}$, which is connected to the macrocategory MC of the test manoeuvre.

Following the operations of block 360, the computer 12 has, for each of the corresponding intermediate time instants $t_{clkj}$ of each test manoeuvre, a number equal to NUM_TW of second strategy training prediction vector $PV''_{mpj}$.

By way of example, FIG. 7 shows the four second strategy training prediction vectors $PV''_{m10}$-$PV''_{m40}$ relating to the intermediate time instant $t_{clk0}$ of the m-th test manoeuvre $M_m$, generated respectively by the four second first-level classifiers $CLASS_1$-$CLASS_4$ connected respectively to the time durations $TW_1'$-$TW_4'$, respectively starting from the four feature vectors of extended manoeuvre training $FV'_{m10}$-$FV'_{m40}$.

Then, for each test manoeuvre, the computer 12 aggregates (block 370, FIG. 12), for each of the intermediate time instants $t_{clkj}$, the second strategy training prediction vectors of $PV''_{mpj}$ (in a number equal to NUM_TW), so as to form a corresponding macrovector, which is again connected to the macrocategory MC of the test manoeuvre, and to which reference is made hereinafter as to the corresponding second training prediction macrovector $MPV''_m j$.

For example, with reference to FIG. 7, the four second strategy training prediction vectors $PV''_{m10}$-$PV''_{m40}$ are aggregated into a second training prediction macrovector $MPV''_{m0}$, which is connected to the macrocategory $MC_m$ of the test manoeuvre $M_m$.

Again with reference to FIG. 12, the computer 12 trains (block 380) a second second-level classifier 251 (shown in FIG. 7), on the basis of the second training prediction macrovectors $MPV''_{mj}$ calculated for the intermediate time instants $t_{clkj}$ of each test manoeuvre.

In practice, the second second-level classifier 251 is trained in a supervised manner, on the basis of the second training prediction macrovectors $MPV''_{mj}$ and of the macrocategories connected thereto. Furthermore, purely by way of example, the second second-level classifier 251 can be a classifier of the logistic regression type.

Figure 16:
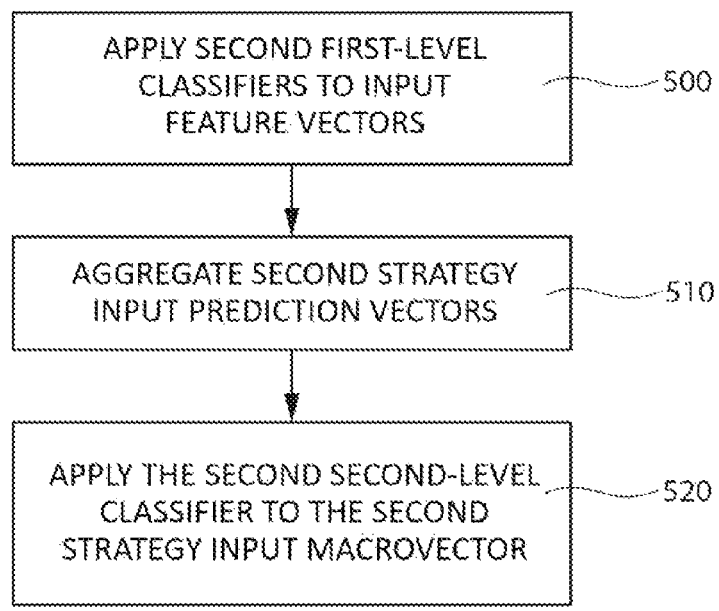
FIG. 16 shows a block diagram relative to analysis operations according to the second strategy.

Once the second first-level classifiers CLASS and the second second-level classifier 251 have been trained, it is possible to determine a second output vector $OUT\_B_k$, relative to the unknown flight indicative of the macrocategory to which an unknown manoeuvre belongs, which takes place in the k-th time instant $t_{clkk}$. To this end, the computer 12 executes the operations shown in FIG. 16 and exemplified in FIG. 11.

In detail, for each k-th time instant $t_{clkk}$ provided by the time base time_clk, the computer 12 applies (block 500, FIG. 16) the aforementioned input feature vectors $FVX_{kp}$ (in a number equal to NUM_TW) to the second first-level classifiers CLASS, in the following manner.

In detail, for each k-th time instant $t_{clkk}$, the computer 12 applies the p-th second first-level classifier $CLASS_p$ to the p-th input feature vector $FVX_{kp}$, so as to obtain a corresponding p-th second strategy input prediction vector $PVX''_{kp}$. In other words, each input feature vector $FVX_{kp}$ is classified through the second first-level classifier CLASS which has been trained on the basis of subsets of the clusters of data DG having a duration equal to or lower than the duration of the subset of the non-labelled data structure 205 to which the same input feature vector $FVX_{kp}$ refers.

In greater detail, the second strategy input prediction vectors $PVX''_{kp}$ have the same dimensions as the first strategy input prediction vectors $PVX'_{kp}$; moreover, each element of any second strategy input prediction vector $PVX_{kp}''$ is indicative of the probability that the corresponding input feature vector $FVX_{kp}$ is connected to the macrocategory MC corresponding to the same element, and therefore that, at the k-th time instant $t_{clkk}$, the unknown helicopter 3 was executing a manoeuvre belonging to said macrocategory MC.

Again with reference to the generic k-th time instant $t_{clkk}$, the computer 12 aggregates (block 510) the second strategy input prediction vectors $PVX''_{kp}$ (in a number equal to NUM_TW), so as to form a corresponding macrovector, to which reference is made hereinafter as to the second strategy input macrovector $MPVX''_k$.

Subsequently, the computer 12 applies (block 520) the second second-level classifier 151 to the second strategy input macrovector $MPVX''_k$, so as to obtain a second output vector $OUT\_B_k$, in which each element is indicative of the probability that the corresponding input feature vector $FVX_{kp}$ is connected to the macrocategory MC that corresponds to the element, and therefore that, at the k-th time instant $t_{clkk}$, the unknown helicopter 3 was executing a manoeuvre belonging to said macrocategory MC. In practice, the second output vector $OUT\_B_k$ represents an improvement of the probabilities contained in the second strategy input prediction vectors $PVX''_{kp}$.

In general, the information contained in the first and second output vectors $OUT\_A_k$, $OUT\_B_k$ can be used as an alternative, in order to identify the macrocategory of the unknown manoeuvre executed in the corresponding k-th time instant $t_{clkk}$. Moreover, the Applicant has observed that the indications contained in the second output vector $OUT\_B_k$ are generally more accurate than those contained in the first output vector $OUT\_A_k$, in particular in the case of manoeuvres characterized by trends of relatively constant primary quantities during manoeuvres. However, in some cases, and in particular in the presence of manoeuvres, each characterized by the presence of very characteristic initial and final portions (so-called "entry" and "recovery" steps), the opposite occurs. In fact, training based on portions of manoeuvres may be not very effective, compared to training based on entire manoeuvres, in the presence of manoeuvres with characteristic portions arranged at the beginning and at the end of the manoeuvre, if such characteristic portions have durations very different from the durations of the training windows. On the contrary, training based on portions of manoeuvres tends to be more effective in the case of manoeuvres in which there occurs, for example, a gradual variation of a quantity (for example, a speed) between an initial value and a final value; in fact, in this case, a classifier trained on the basis of entire manoeuvres tends to recognize only manoeuvres in which this quantity exactly assumes such initial and final values, while a classifier based on portions of manoeuvres has the possibility of suitably weighing the trend (variation) of the quantity in each portion of the manoeuvre.

Figure 17:
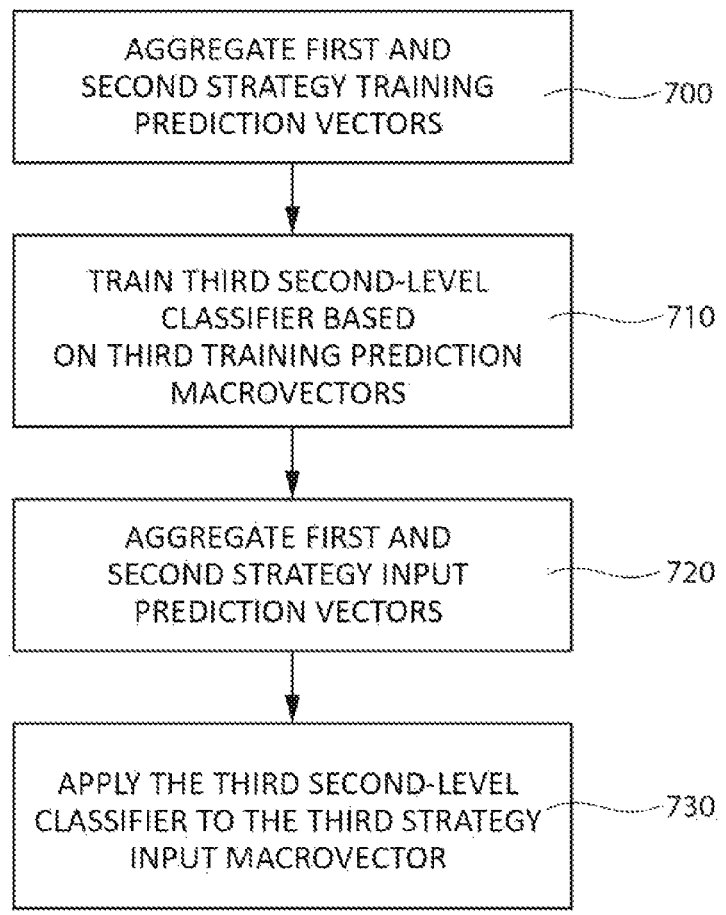
FIG. 17 shows a block diagram relative to training and analysis operations according to a third strategy.
Figure 18:
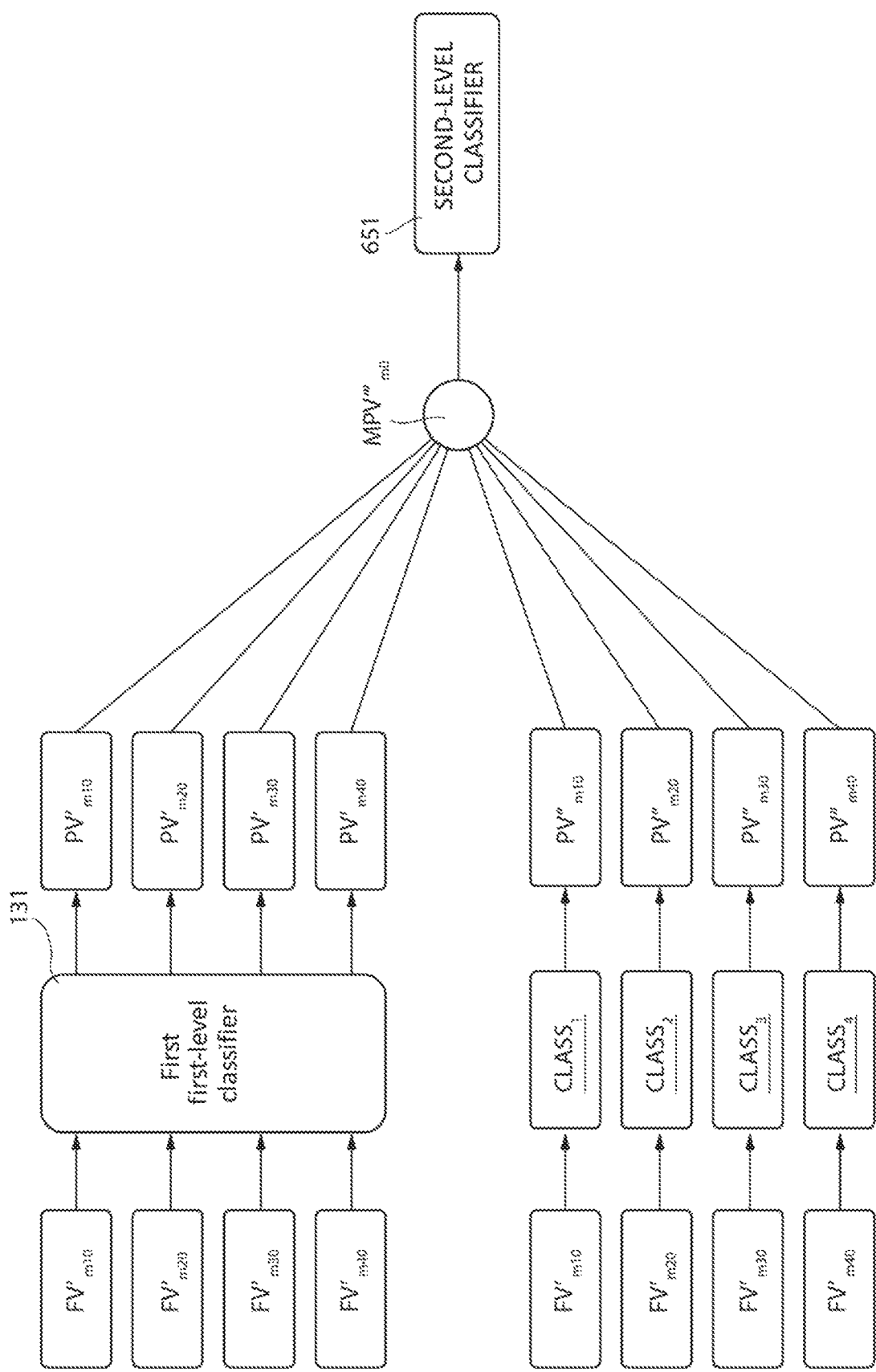
FIG. 18 is a block diagram exemplifying training operations according to the third strategy.

According to a further variant, the first and second strategy may be combined by using a third second-level classifier 651, which is trained as described in FIG. 17 and exemplified in FIG. 18.

In detail, for each test manoeuvre, the computer 12 aggregates (block 700, FIG. 17), for each of the corresponding intermediate time instants $t_{clkj}$, the corresponding first strategy training prediction vectors $PV'_{mpj}$ (in a number equal to NUM_TW), generated by the first first-level classifier 131, and the second strategy training prediction vectors $PV''_{mpj}$ each generated by a corresponding second first-level classifier CLASS, so as to obtain a third training prediction macrovector $MPV'_{mj}$, which is still connected to the macrocategory MC of the test manoeuvre that is taking place in the intermediate time instant $t_{clkj}$.

For example, FIG. 18 qualitatively shows the aggregation of the first strategy training prediction vectors $PV'_{m10}$-$PV'_{m40}$ with the second strategy training prediction vectors $PV''_{m10}$-$PV''_{m40}$, in order to form the third training prediction macrovector $MPV'''_{m0}$.

Subsequently, the computer 12 trains (block 710) the third second-level classifier 651, on the basis of the third training prediction macrovectors $MPV'''_{mj}$ relating to the intermediate time instants $t_{clkj}$ of the test manoeuvres and to the macrocategories MC connected to said third training prediction macrovectors $MPV'''_{mj}$. The third second-level classifier 651 is then trained in a supervised manner and may be for example of the same type as the first and second second-level classifier 151, 251.

Once the third second-level classifier 651 has been trained, the computer 12 can analyse the unknown flight. To this end, referring for example to the generic k-th time instant $t_{clkk}$, the computer 12 aggregates (block 720) the corresponding first strategy input prediction vectors $PVX'_{kp}$ with the second strategy input prediction vectors $PVX''_{kp}$, to form a corresponding third strategy input macrovector $MPVX'''_k$, to which the computer 12 applies (block 730) the third second-level classifier 651, so as to obtain a third output vector $OUT\_C_k$.

Figure 19:
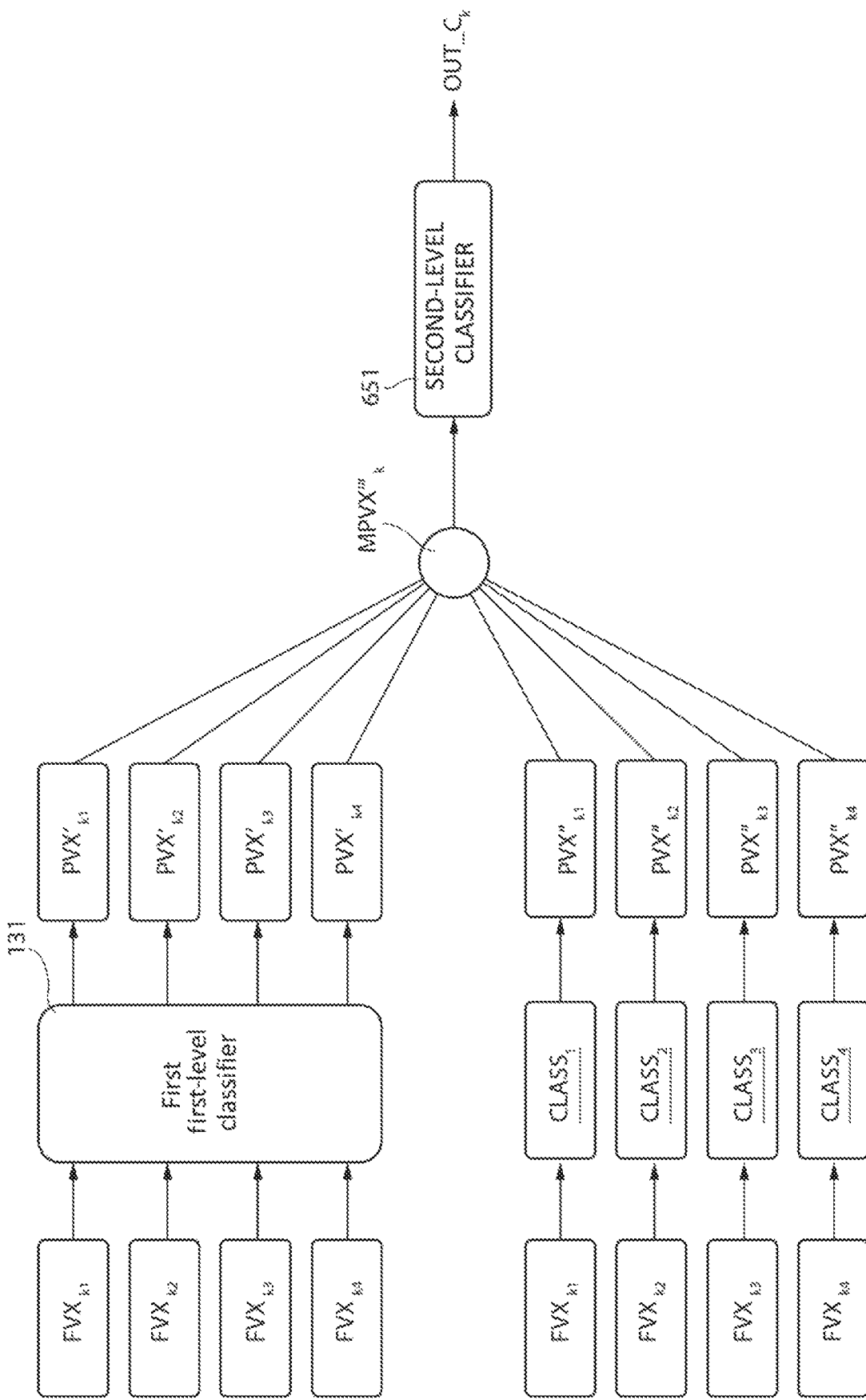
FIG. 19 is a block diagram exemplifying analysis operations according to the third strategy.

For example, FIG. 19 shows the generation of the third strategy input macrovector $MPVX'''_k$ by aggregation of the first strategy input prediction vectors $PVX'_{k1}$-$PVX'_{k4}$ and of the second strategy input prediction vectors $PVX''_{k1}$-$PVX''_{k4}$.

Figure 20A:
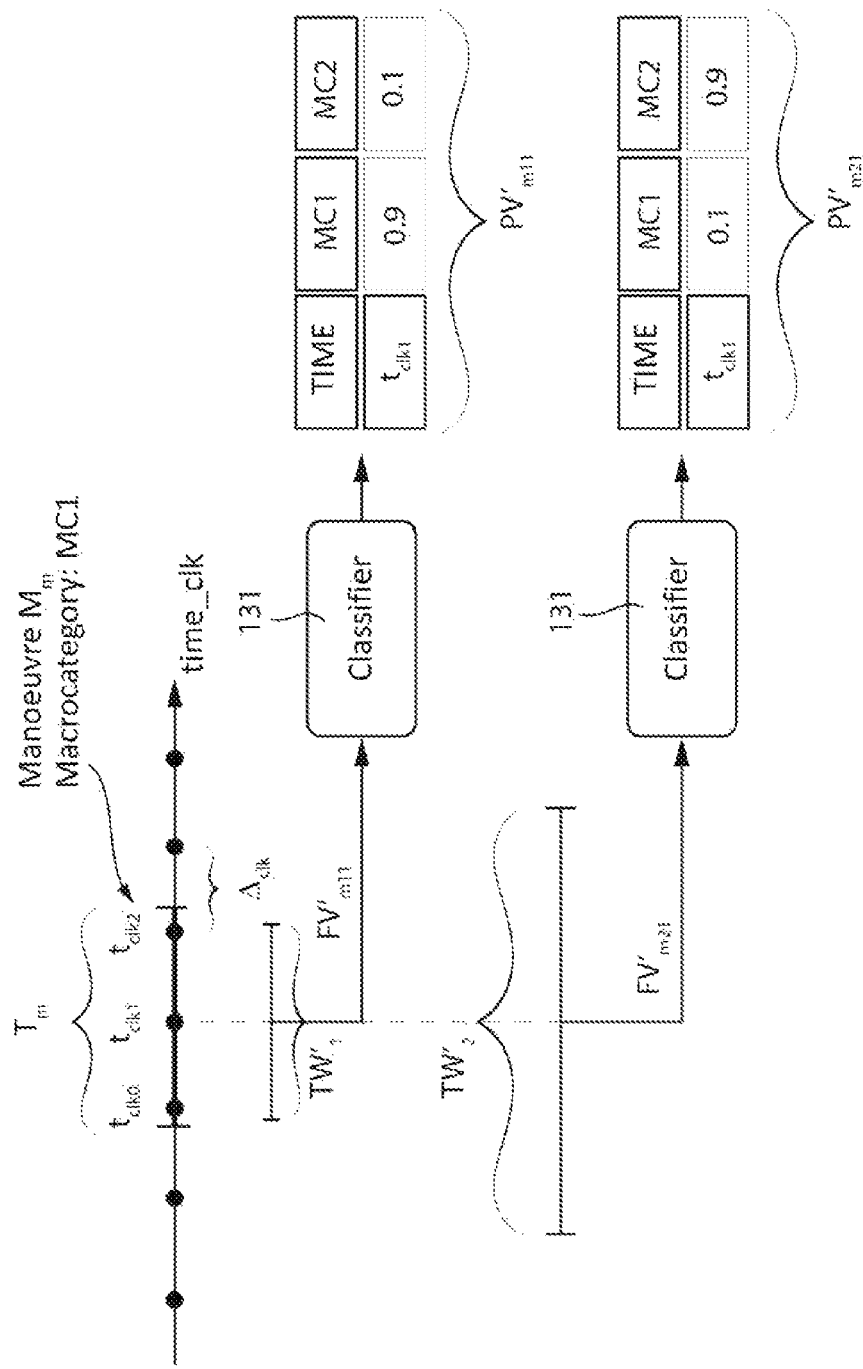
FIGS. 20A-20B show block diagrams relative to classification operations carried out according to the first strategy.

In general, the first, second and third output vectors $OUT\_A_k$, $OUT\_B_k$, $OUT\_C_k$ all benefit from the action of the corresponding second-level classifiers, which allow to improve the classification provided by the first-level classifiers, for the reasons explained below with reference, for brevity's sake, to the first strategy only, and therefore to the first output vector $OUT\_A_k$. In particular, hereinafter reference is made to FIGS. 20A and 20B, which refer to a simplified case, in which NUM_MC is equal to two (only a first and a second macrocategory MC1, MC2 are available) and furthermore NUM_TW is equal to two (only a first and a second time duration $TW'_1$, $TW'_2$ are available). Furthermore, in FIGS. 20A and 20B reference is made to the effect of the training of the first second-level classifier 151 by means of the feature vectors of extended manoeuvre training $FV'_{m11}$ and $FV'_{m21}$ relating to the intermediate time instant $t_{clk1}$ of the m-th manoeuvre $M_m$, which belongs to the first macrocategory MC1, and whose time interval $T_m$ is assumed to have an extension falling between the first and the second time duration $TW'_1$, $TW'_2$. The intermediate time instant $t_{clk1}$ falls about half the time interval $T_m$.

Figure 20B:
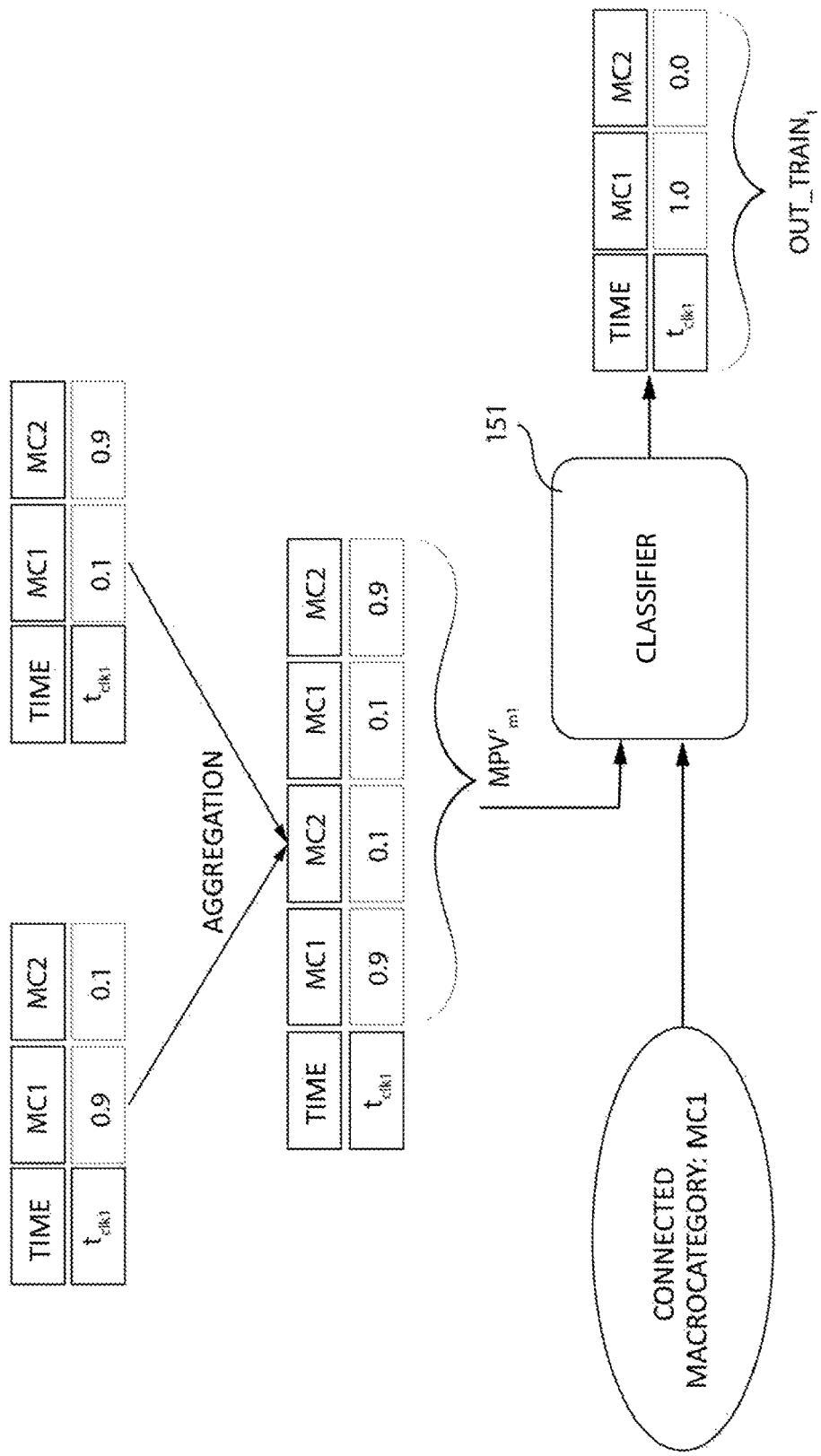

In consideration of the foregoing, the first first-level classifier 131 generates the two first strategy training prediction vectors $PV'_m$ii and $PV'_{m21}$, starting respectively from the feature vectors of extended manoeuvre training, $FV'_{m11}$ and $FV'_{m21}$. The element of the first strategy training prediction vector $PV'_{m11}$ relating to the macrocategory MC1 has, correctly, a high value (0.9), while the element relative to the macrocategory MC2 has, correctly, a low value (0.1). On the contrary, the element of the first strategy training prediction vector $PV'_{m21}$ relating to the macrocategory MC1 has, erroneously, a low value (0.1), while the element relative to the macrocategory MC2 has, erroneously, a high value (0.9). This is due to the fact that, while the feature vector of extended manoeuvre training $FV'_{m11}$ refers to a time window that has a duration similar to that of the time interval $T_m$, a significant part of the time window to which the feature vector of extended manoeuvre training $FV'_{m21}$ refers falls outside the time interval $T_m$. However, since both feature vectors of extended manoeuvre training $FV'_{m11}$ and $FV'_{m21}$ are connected to the macrocategory MC1, the training of the first second-level classifier 151 causes it to assign, for the macrocategory MC1, a greater weight to the corresponding element of the first strategy training prediction vector $PV'_{m11}$, instead of to the corresponding element of the first strategy training prediction vector $PV'_{m21}$. Consequently, as shown in FIG. 20B, in which a possible output vector OUT_TRAIN$_1$ generated by the first second-level classifier 151 when applied to the first training prediction macrovector $MPV'_{m1}$ is reported (obtained by aggregation of the first strategy training prediction vectors $PV'_{m11}$ and $PV'_{m21}$), the elements relating to the macrocategories MC1 and MC2 of the output vector OUT_TRAIN$_1$ are correctly equal to, respectively, one and zero.

In addition, the third output vector $OUT\_C_k$ is typically more accurate than the first and second output vectors $OUT\_A_k$, $OUT\_B_k$, since the relative generation mechanism adapts to either the case of manoeuvres in which the primary quantities are relatively constant (i.e. stationary), or to the case of manoeuvres with rapidly variable primary quantities.

Figure 21:
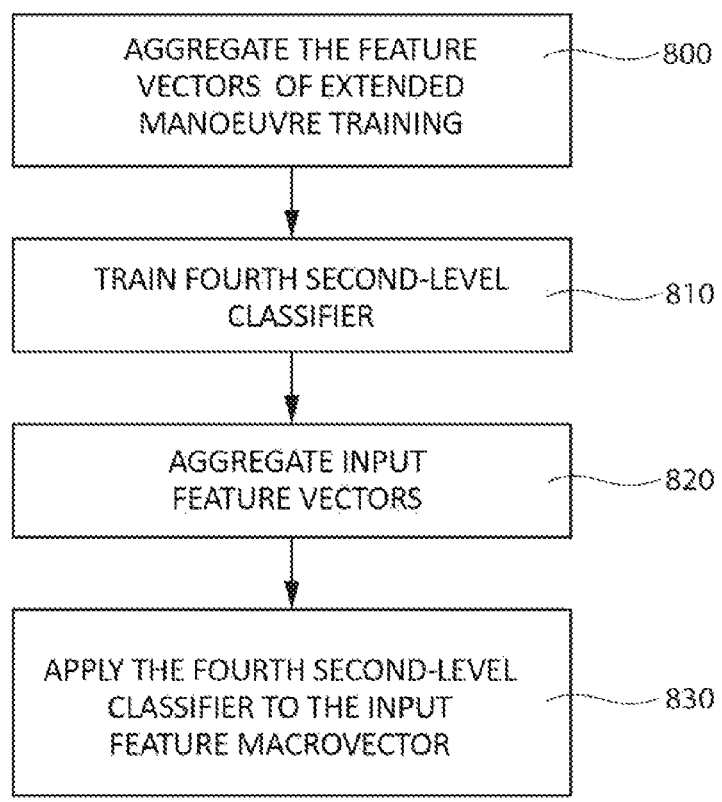
FIG. 21 shows a block diagram relative to training and analysis operations according to a fourth strategy.
Figure 22:
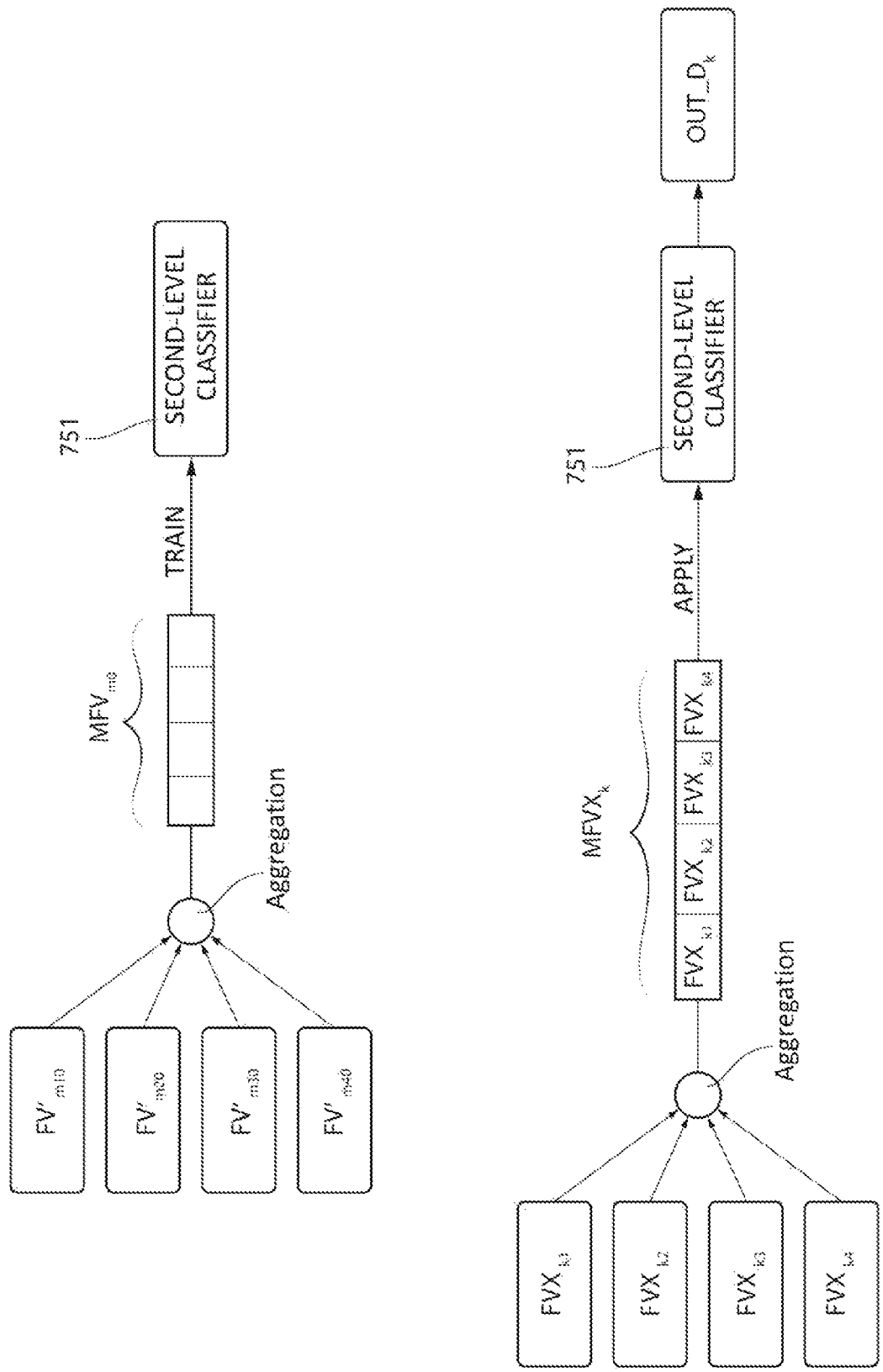
FIG. 22 shows two block diagrams exemplifying, respectively, training and analysis operations according to the fourth strategy.

According to a further variant, shown in FIG. 21 and exemplified in FIG. 22, the computer 12 trains a fourth second-level classifier 751, as described below, so as to implement a fourth strategy.

In detail, for each test manoeuvre, the computer 12 aggregates (block 800), for each of the corresponding intermediate time instants $t_{clkj}$, the corresponding feature vectors of extended manoeuvre training $FV'_{mpj}$, so as to obtain a training feature macrovector $MFV_{mj}$, which is connected to the macrocategory MC of the test manoeuvre. For example, FIG. 22 shows the aggregation of the four feature vectors of extended manoeuvre training $FV'_{m10}$-$FV'_{m40}$ in the training feature macrovector $MFV_{m0}$, which is connected to the macrocategory $MC_m$ of the m-th test manoeuvre $M_m$.

Subsequently, the computer 12 trains (block 810) the fourth second-level classifier 751, as a function of the training feature macrovectors $MFV_{mj}$ and of the macrocategories MC connected thereto. In practice, the fourth second-level classifier 751 is trained in a supervised manner and may be, for example, a random forest type classifier.

With respect to the unknown flight, for each k-th time instant $t_{clkk}$, the computer aggregates (block 820) the input feature vectors $FVX_{kp}$, so as to obtain a corresponding input feature macrovector $MFVX_k$, to which the computer 12 applies (block 830) the fourth second-level classifier 751, so as to obtain a fourth output vector $OUT\_D_k$. FIG. 22 shows, for example, the aggregation of the input feature vectors $FVX_{k1}$-$FVX_{k4}$.

Also in this case, the presence of the fourth second-level classifier 751 allows to obtain the same benefits described with reference to the first, second and third second-level classifier 151, 251, 651. Moreover, this strategy is characterized by a lower complexity since it provides for a single level of classification.

In general, the Applicant has noted that, thanks to the fact that the probability estimates contained in the output vectors $OUT\_A_k$, $OUT\_B_k$, $OUT\_C_k$ and $OUT\_D_k$ are generated by means of classification algorithms executed starting from feature vectors generated by selecting, through time windows having different dimensions, portions of the non-labelled data structure 205, these estimates are satisfactory substantially irrespective of the duration of the manoeuvres.

In practice, the variants described above allow to identify with considerable accuracy the occurrence, during an unknown flight, of a manoeuvre belonging to one of the aforementioned macrocategories MC. However, the Applicant has observed that, if two or more manoeuvres are executed at the same time during the unknown flight, the accuracy of the identification may be reduced. To obviate this drawback, the Applicant observes that it is possible to implement the following.

Figure 23:
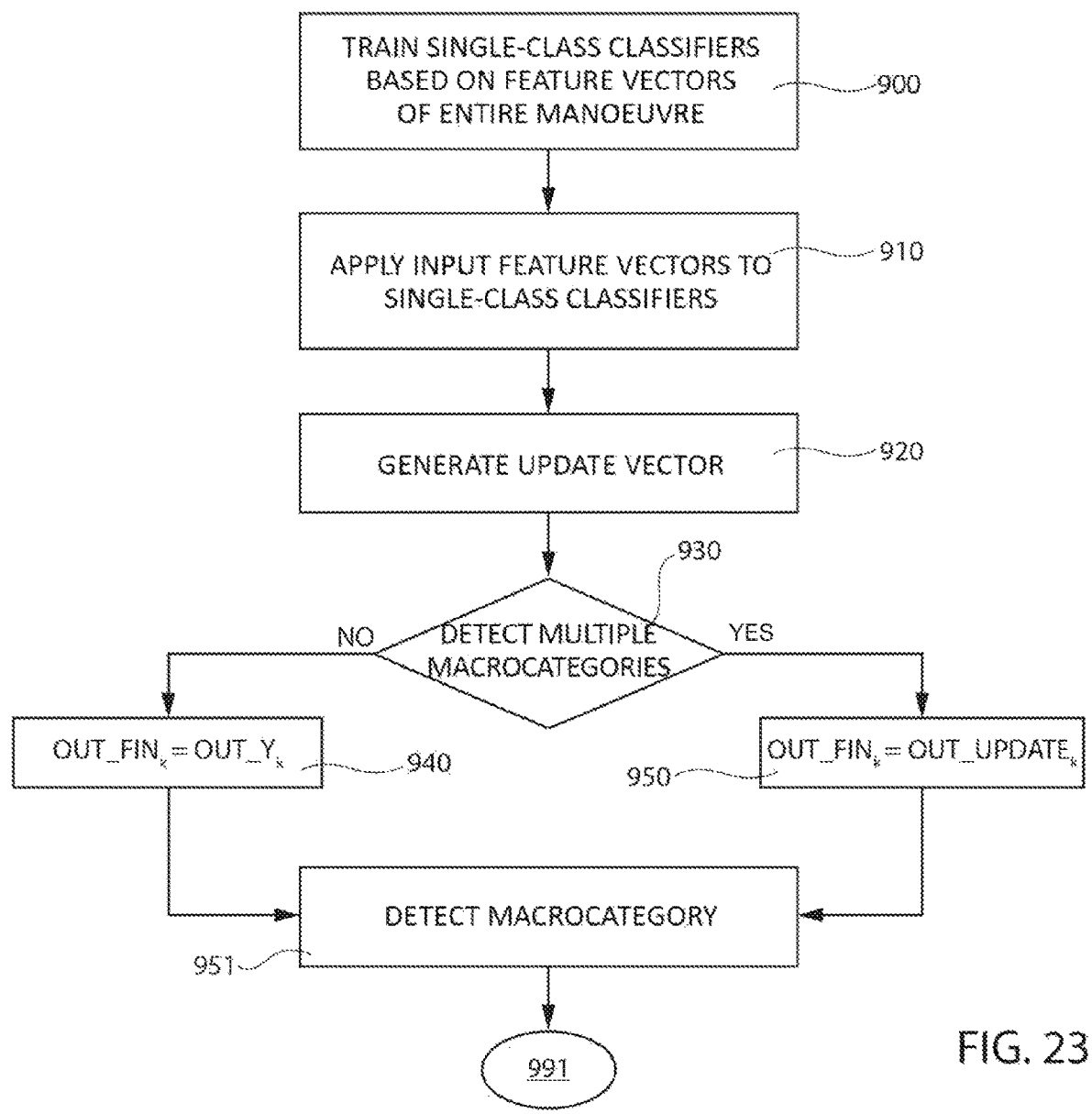
FIGS. 23 and 26 show block diagrams relative to operations carried out, respectively, according to a first and a second variant of the present method.

As shown in FIG. 23, the computer trains (block 900) a plurality of classifiers 910, which are referred to hereinafter as single-class classifiers SCC (shown in FIG. 24).

In detail, for each macrocategory MC, the computer 12 trains a corresponding single-class classifier SCC, on the basis of the vectors of entire manoeuvre features $FV_m$. In particular, considering for example an i-th single-class classifier $SCC_1$ (with i=1, . . . , NUM_MC), it is trained on the basis of the feature vectors of entire manoeuvre $FV_m$ connected to test manoeuvres, which, if they are related to manoeuvres belonging to the i-th macrocategory $MC_i$, are connected for example to a first label (for example, unitary), otherwise they are connected to a second label (for example, invalid); in other words, the label is indicative of the match/mismatch between the macrocategory MC of the test manoeuvre and the macrocategory $MC_i$ which corresponds to the i-th single-class classifier $SCC_1$.

Subsequently, considering the unknown flight and the generic k-th time instant $t_{clkk}$, the computer 12 applies (block 910) each input feature vector $FVX_{kp}$ (with p=1, . . . , NUM_TW) to the single-class classifiers SCC, so as to obtain, for each input feature vector $FVX_{kp}$, a corresponding single-class probability vector $SCV_{kp}$, wherein the i-th element represents the probability that the input feature vector $FVX_{kp}$ refers to the i-th macrocategory $MC_i$, as calculated by the i-th single-class classifier $SCC_1$.

Figure 24:
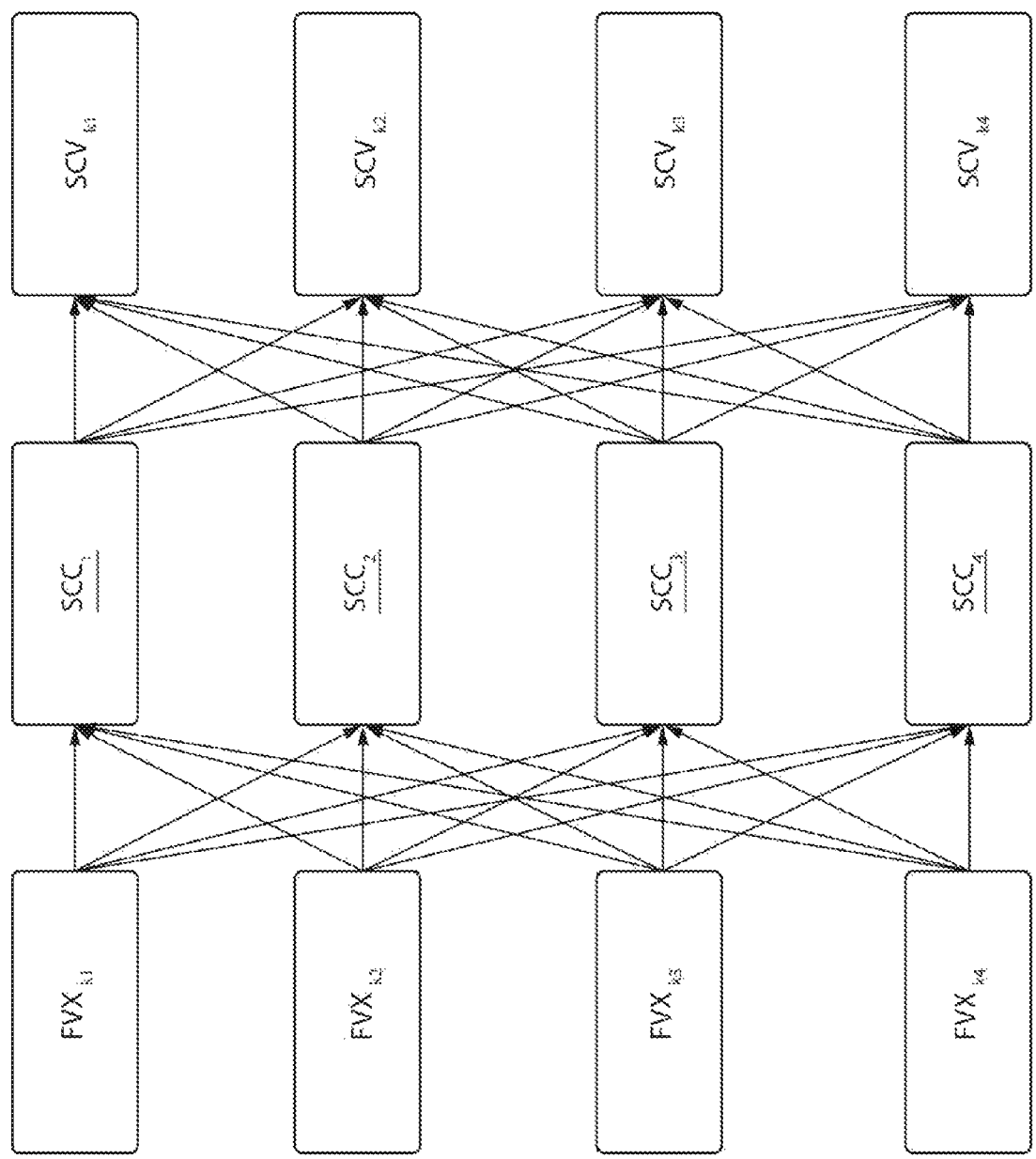
FIG. 24 shows a block diagram exemplifying analysis operations according to the second variant.
Figure 25:
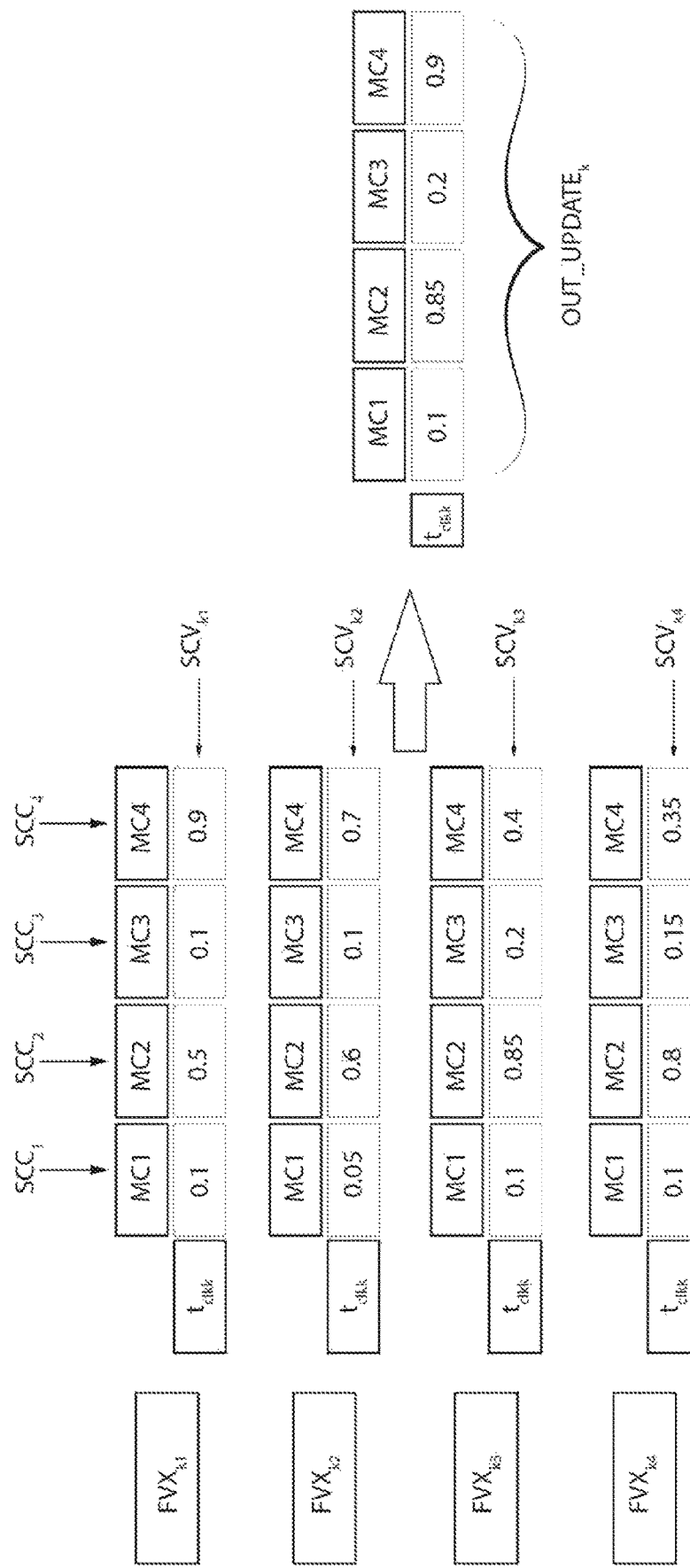
FIGS. 25 and 27 show tables relative to the first and second variants of the present method, respectively.

For example, FIG. 24 shows the application to the four input feature vectors $FVX_{k1}$-$FVX_{k4}$ of four single-class classifiers $SCC_1$-$SCC_4$ and the consequent generation of the single-class probability vectors $SCV_{k1}$-$SCV_{k4}$; examples of the latter vectors are shown in FIG. 25.

Then, the computer 12 generates (block 920) an update vector $OUT\_UPDATE_k$, so that it has a number of elements equal to the number NUM_MC, the generic i-th element being equal to the maximum among the values of the i-th elements of the single-class probability vectors $SCV_{kp}$, that is, to the maximum among the values provided by the i-th single-class classifier $SCC_1$ when it is applied to the input feature vectors $FVX_{kp}$ of the k-th time instant $t_{clkk}$ (in a number equal to NUM_TW). Although not further described, it is however possible that, in order to generate the update vector $OUT\_UPDATE_k$, the i-th element of the latter is set equal to a statistical quantity (for example, the mean) calculated on the basis of the i-th elements of the single-class probability vectors $SCV_{kp}$, instead of the aforementioned maximum.

Subsequently, the computer 12 detects (block 930), on the basis of the update vector $OUT\_UPDATE_k$, whether in the k-th time instant $t_{clkk}$ two or more manoeuvres belonging to different macrocategories MC are executed (that is, it detects a condition of multiple macrocategories), for example, by detecting whether two or more elements of the update vector $OUT\_UPDATE_k$ exceed a predetermined threshold. For example, with reference to FIG. 25, in which a threshold equal to 0.5 is assumed, the computer 12 detects that, at the time instant $t_{clkk}$, two manoeuvres belonging respectively to a macrocategory MC2 and a macrocategory MC4 are executed simultaneously. In general, although not further described, the detection of multiple macrocategories may also provide for varying the value of the aforementioned threshold, for example by connecting to each macrocategory MC a corresponding threshold, and/or an additional control, downstream of the detection of the multiple macrocategories, in order to exclude possible combinations of multiple macrocategories without physical meaning (for example, in order to exclude multiple macrocategories including macrocategories relative to opposite manoeuvres).

In the continuation reference is made to the multiclass strategy output vector $OUT\_Y_k$ to indicate the vector alternately equal to the first, second, third or fourth output vector $OUT\_A_k$, $OUT\_B_k$, $OUT\_C_k$, $OUT\_D_k$, depending on the program implemented by the computer 12. In consideration of the foregoing, in the event that no manoeuvres belonging to different macrocategories MC are detected (output NO of block 930), the computer 12 sets (block 940) a final vector $OUT\_FIN_k$ equal to the multiclass strategy output vector $OUT\_Y_k$, since, in the time instant $t_{clkk}$, manoeuvres belonging to different macrocategories MC were not taking place, and therefore the probabilities of the multiclass strategy output vector $OUT\_Y_k$ are reliable. In the opposite case, i.e. in the case where manoeuvres belonging to different macrocategories MC are detected (output YES of block 930), the computer 12 sets (block 950) the final vector $OUT\_FIN_k$ equal to the update vector $OUT\_UPDATE_k$, since, in this particular circumstance (simultaneous execution of manoeuvres belonging to different macrocategories), the probabilities contained in the latter tend to be more accurate than those of the multiclass strategy output vector $OUT\_Y_k$.

On the basis of the final vector $OUT\_FIN_k$, the computer 12 detects (block 951) the macrocategory MC of the manoeuvre executed in the time instant $t_{clkk}$, for example by selecting, in case of non-detection of manoeuvres belonging to different macrocategories MC, the macrocategory MC connected to the highest value contained in the final vector $OUT\_FIN_k$, or by selecting, in the case of detection of manoeuvres belonging to different macrocategories MC, the macrocategory MC connected to the highest value contained in the final vector $OUT\_FIN_k$ or by selecting, among the multiple macrocategories detected during the operations referred to in block 930, the macrocategory that is the most relevant from the point of view of fatigue of the components of the unknown helicopter 3.

Figure 26:
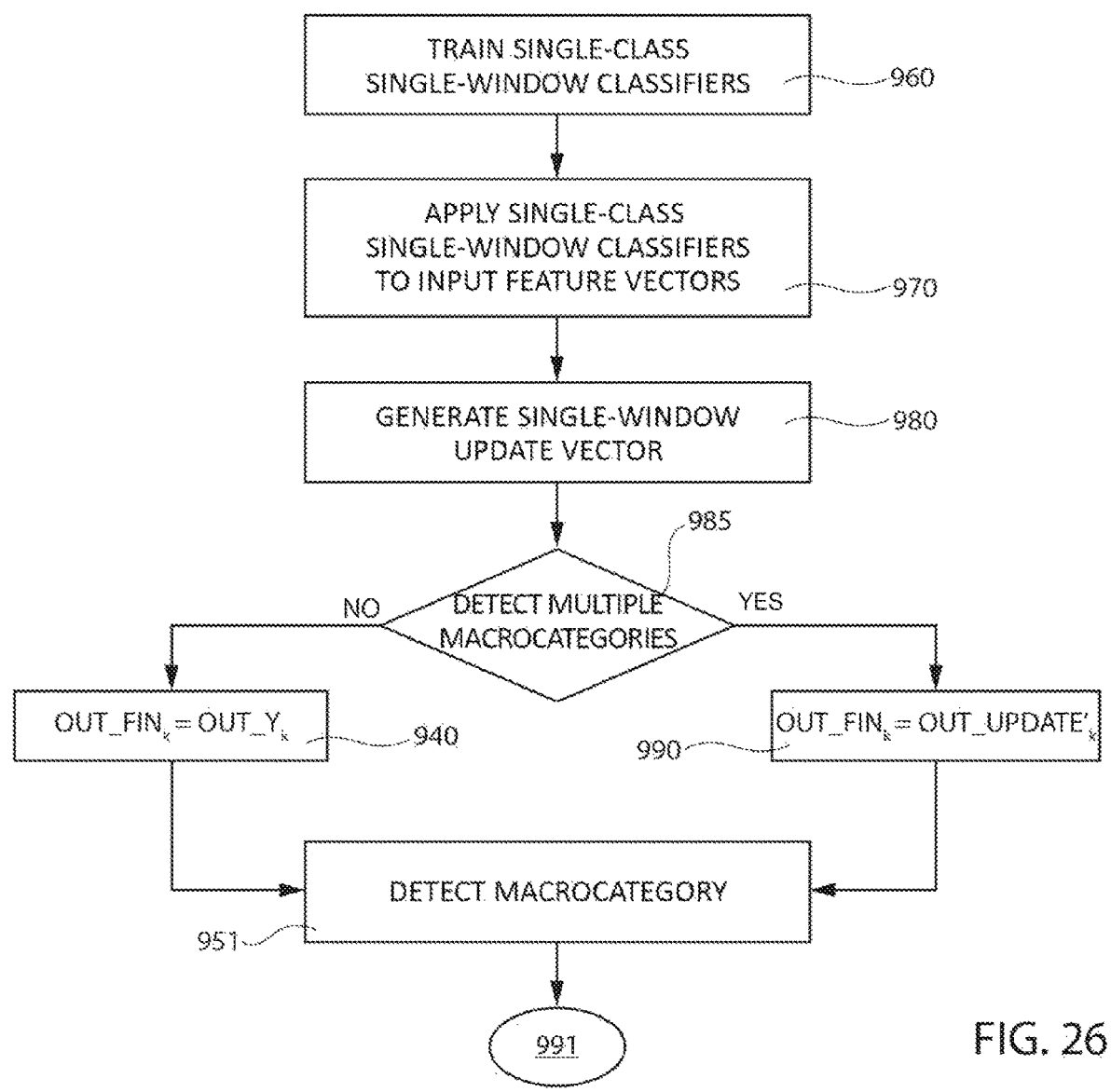

According to a further variant shown in FIG. 26, the computer 12 trains (block 960), for each time duration TW', a corresponding number of single-class classifiers SCC' (shown in FIG. 27) equal to the number of macrocategories NUM_MC, to which reference is made hereinafter as to single-class single-window classifiers SCC'. The calculator 12 thus trains a number equal to NUM_TW*NUM_MC of single-class single-window classifiers SCC', which are then indexed by means of the index 'p' and the index 'i'.

In detail, considering the single-class single-window classifier $SCC'_{pi}$, it is trained on the basis of feature vectors of partial manoeuvre $FV''_{mpu}$ relating to the p-th time duration $TW'_p$, which, if they are related to manoeuvres belonging to the i-th macrocategory $MC_i$, are connected, for example, to a first label (for example, unitary), otherwise they are connected to a second label (for example, invalid), that is, they are connected to a label indicative of the match/mismatch between the macrocategory MC of the test manoeuvre and the macrocategory $MC_i$ which corresponds to the single-class single-window classifier $SCC'_{pi}$.

The generic single-class single-window classifier $SCC'_{pi}$ is therefore trained on the basis of feature vectors calculated on portions of clusters of data DG which have time extensions not higher than the corresponding time duration $TW'_p$.

Subsequently, considering the unknown flight and the generic k-th time instant $t_{clkk}$, the computer 12 applies (block 970) each input feature vector $FVX_{kp}$ (with p=1, ..., NUM_TW), relating to the p-th time duration $TW'_p$, to the corresponding single-class single-window classifiers $SCC'_{pi}$ (in a number equal to NUM_MC) relating to the same p-th time duration $TW'_p$, so as to obtain, for each input feature vector $FVX_{kp}$, a corresponding single-class single-window probability vector $SCV'_{kp}$, in which the i-th element represents the probability that the input feature vector $FVX_{kp}$ refers to the i-th macrocategory $MC_i$, as calculated by the single-class single-window classifier $SCC'_{pi}$.

Figure 27:
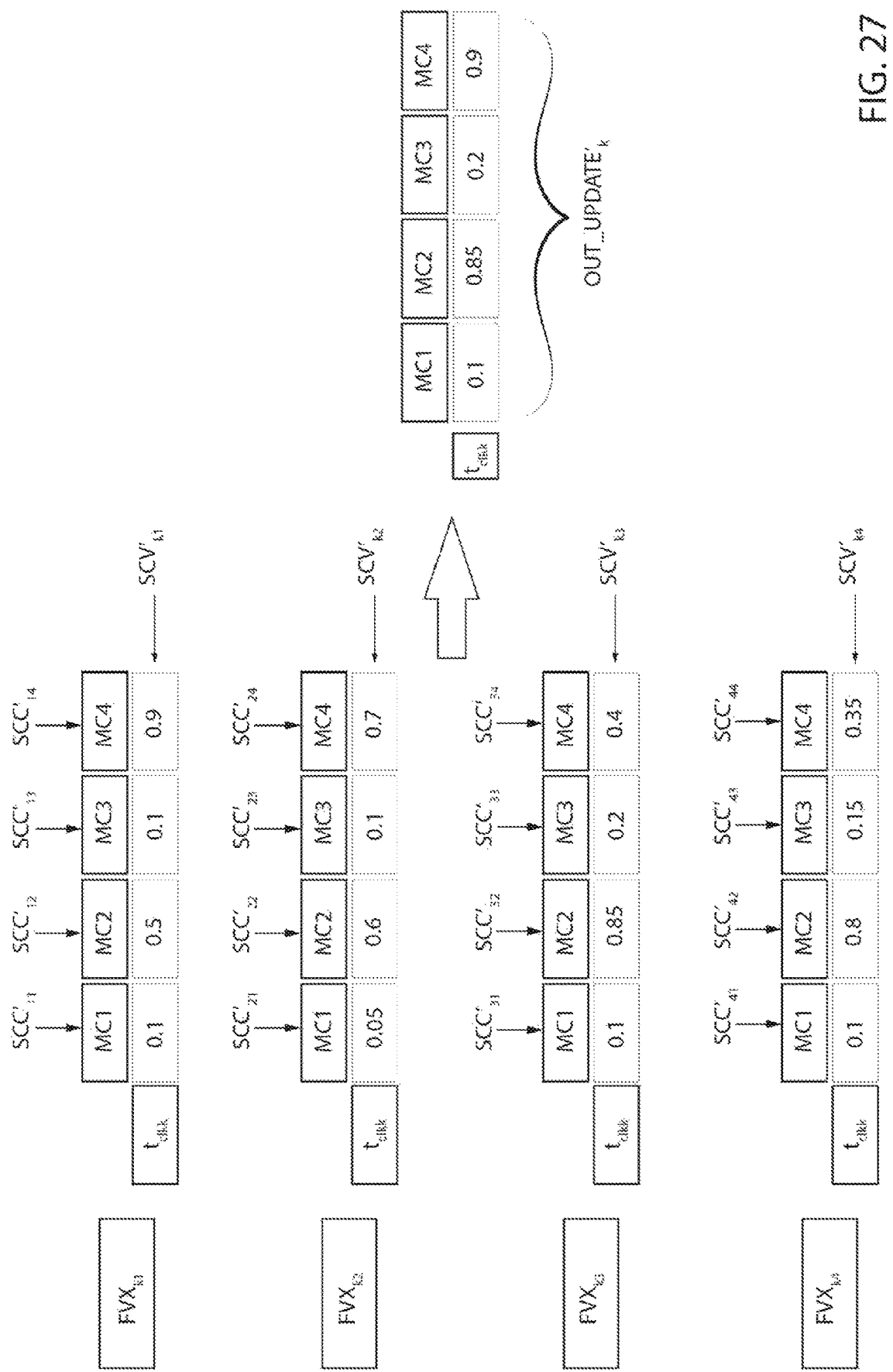

For example, FIG. 27 shows the four input feature vectors $FVX_{k1}$-$FVX_{k4}$ which are classified by, respectively, the following single-class single-window classifiers $SCC'_{11}$-$SCC'_{14}$; $SCC'_{21}$-$SCC'_{24}$; $SCC'_{31}$-$SCC'_{34}$; and $SCC'_{41}$-$SCC'_{44}$; in this way, the single-class single-window probability vectors $SCV'_{k1}$-$SCV'_{k4}$ are generated. Only for the simplicity's sake, the same values used in FIG. 25 have been adopted in FIG. 27, although in reality there may be differences.

Then, the computer 12 generates (block 980) a single-window update vector $OUT\_UPDATE'_k$, so that it has a number of elements equal to the number NUM_MC, the generic i-th element being equal to the maximum among the values of the i-th elements of the single-class single-window probability vectors $SCV'_{kp}$, with p=1, ..., NUM_TW. Although not described further, it is, however, possible that, in order to generate the single-window update vector $OUT\_UPDATE'_k$, the i-th element of the latter is set equal to a statistical quantity (for example, the mean) calculated on the basis of the i-th elements of the single-class single-window probability vectors $SCV'_{kp}$, instead of at the aforementioned maximum.

Subsequently, the computer 12 detects (block 985), on the basis of the single-window update vector $OUT\_UPDATE'_k$, whether in the k-th time instant $t_{clkk}$ two or more manoeuvres belonging to different macrocategories MC are executed (that is, it detects a condition of multiple macrocategories), for example, by detecting whether two or more elements of the single-window update vector $OUT\_UPDATE'_k$ exceed a predetermined threshold. Furthermore, although not further described, the detection of multiple macrocategories may provide for further threshold controls/variation mechanisms, as described with reference to block 930.

In the event that no manoeuvres belonging to different macrocategories MC are detected (output NO of block 985), the computer 12 executes the operations of block 940. Otherwise, that is if manoeuvres belonging to different macrocategories MC are detected (output YES of block 985), the computer 12 sets (block 990) the final vector $OUT\_FIN_k$ equal to the single-window update vector $OUT\_UPDATE'_k$ and then performs the operations of block 951.

The operations of blocks 960-990 are characterized by a greater computational burden and by the creation of a high number of classifiers compared to the operations of blocks 900-950, however, they can guarantee good performance, in particular in the case of manoeuvres with quantities having relatively constant trends.

Regardless of the strategy adopted, the computer 12 may use the macrocategory detected through the operations indicated in block 951 to carry out also a detection (identification) of the corresponding manoeuvre carried out. This identification can take place in a deterministic way on the basis of the values of one or more primary quantities and is represented by block 991 shown either in FIG. 23 or in FIG. 26.

In detail, given a macrocategory detected at block 951 and relating to a manoeuvre executed in the k-th time instant $t_{clkk}$, the computer 12 can identify said manoeuvre on the basis of the detected macrocategory and of at least a value of at least one primary quantity of the non-labelled data structure 205, such as, for example, a value relating to a speed in the k-th time instant $t_{clkk}$ or in other time instants $t_{clk}$.

In general, the information on the detected macrocategories, as well as, if necessary, on the detected manoeuvres, can be used to determine the state of usage of the unknown helicopter 3, for example in order to plan efficiently the maintenance of the unknown helicopter 3.

Figure 28:
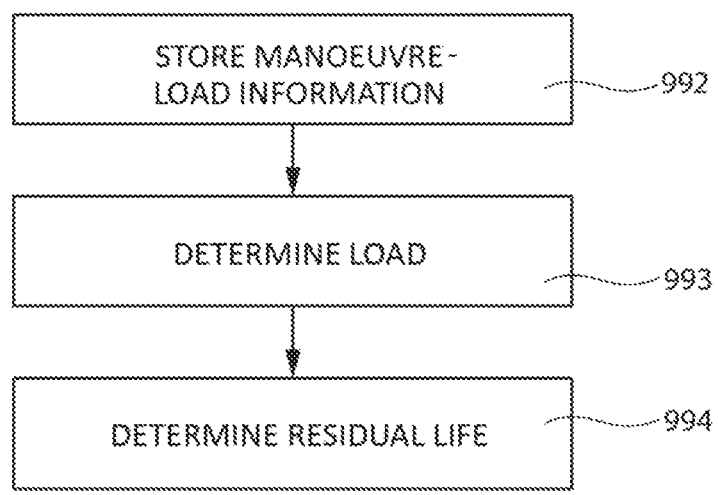
FIG. 28 shows a block diagram relative to operations according to the present method.

For example, as shown in FIG. 28, the computer 12 may store (block 992) information correlating the loads to which one or more components of the helicopter 1 have been subjected, when the latter has executed corresponding manoeuvres, which belong to corresponding macrocategories MC; to this end, the helicopter 1 was equipped, during the execution of the manoeuvres, with a load detection system 17, which is configured to detect the loads to which the components are subjected.

Moreover, referring for brevity's and simplicity's sake to a single component of the unknown helicopter 3, and in the hypothesis in which the unknown helicopter 3 is equal to the helicopter 1, the computer 12 determines (block 993), for each manoeuvre identified through the operations of block 991, the load to which this component of the unknown helicopter 3 has been subjected during this manoeuvre, on the basis of the stored load corresponding to this manoeuvre. On the basis of the determined load, the computer 12 determines (block 994) the state of fatigue and therefore the residual fatigue life of the component.

On the basis of the residual fatigue life of the components of the unknown helicopter 3 thus determined, it is also possible to plan any maintenance operations of the unknown helicopter 3.

The advantages that the present method allows to obtain emerge clearly from the previous description.

In particular, the present system allows to precisely detect the macrocategories of the manoeuvres executed by an aircraft, irrespective of the type, and therefore of the duration, of the macrocategories. Such measurements can therefore be used reliably to estimate the fatigue state and therefore the residual fatigue life of the components of an aircraft; consequently, such measurements can be used, for example, to optimise the maintenance operations of a fleet of aircrafts, respecting the safety requirements.

Clearly, changes may be made to the method and system described and shown herein without, however, departing from the scope of the present invention, as defined in the accompanying claims.

For example, the first- and second-level classifiers may be of a different type with respect to what has been described.

The time windows may be aligned differently from the time instants, instead of being centred with respect thereto. For example, referring to the operations of block 220, relating to the selection, for each of the time durations $TW'_p$, of a subset of values of the non-labelled data structure 205, this subset may be formed by the values of the non-labelled data structure 205 that fall into the time window ranging between $t_{clkk}$ and $t_{clkk}+TW'_p$.

Finally, in general at least some of the macrocategories may include a limited number of manoeuvres (at the limit, only a corresponding manoeuvre).

The invention claimed is:

1. Method implemented through a computer (12) for detecting the execution, by an aircraft (3), of a manoeuvre belonging to a macrocategory among a plurality of macrocategories (MC), comprising the steps of:
   receiving a data structure (205) including a plurality of time series of values of quantities relating to a flight of the aircraft (3), said values having been acquired through a monitoring system (4) coupled to the aircraft (3);
   said method further comprising performing, for each time instant ($t_{clkk}$) of a first succession of time instants ($t_{clk}$), the steps of:
   for each time duration ($TW'_p$) among a plurality of predetermined time durations (TW'), selecting (310) a corresponding subset of the data structure (205), which has a time extension equal to the time duration ($TW'_p$), the selected subsets of the data structure (205) having a same time distance from the time instant ($t_{clkk}$);
   from each selected subset of the data structure (205), extracting (320) a corresponding feature vector ($FVX_{kp}$);
   on the basis of the feature vectors ($FVX_{kp}$), generating (330,335;500,510;720;820) a corresponding input macrovector ($MPVX'_k$; $MPVX''_k$, $MPVX'''_k$; $MFVX_k$), alternatively by aggregation (820) of the feature vectors ($FVX_{kp}$) or by:
   executing classifications (330;500) of the feature vectors ($FVX_{kp}$), said classifications being executed so as to generate a plurality of input prediction vectors ($PVX'_{kp}$;$PVX''_{kp}$), each of which is indicative, for each of said macrocategories (MC), of a corresponding probability that, in said time instant ($t_{clkk}$) of the first succession of time instants ($t_{clk}$), the aircraft (3) was executing a manoeuvre belonging to said macrocategory (MC); and
   subsequent aggregation (335;510;720) of said plurality of input prediction vectors ($PVX'_{kp}$;$PVX''_{kp}$);
   said method further comprising performing, for each time instant ($t_{clkk}$) of the first succession of time instants ($t_{clk}$), the steps of:
   applying (338;520;730;830) to the input macrovector ($MPVX'_k$; $MPVX''_k$, $MPVX'''_k$; $MFVX_k$) an output classifier (151;251;561;721), which is configured to generate a corresponding output vector ($OUT\_A_k$; $OUT\_B_k$; $OUT\_C_k$; $OUT\_D_k$) including, for each of said macrocategories (MC), a corresponding estimate of the probability that, in said time instant ($t_{clkk}$) of the first succession of time instants ($t_{clk}$), the aircraft (3) was executing a manoeuvre belonging to said macrocategory (MC); and
   on the basis of the output vector ($OUT\_A_k$; $OUT\_B_k$; $OUT\_C_k$; $OUT\_D_k$), detecting (940,950,951,990) the macrocategory (MC) to which the manoeuvre executed by the aircraft (3) in said time instant ($t_{clkk}$) of the first succession of time instants ($t_{clk}$) belongs.

2. Method according to claim 1, wherein said output classifier (151;251;651;751) has been generated starting from a training data structure (10) including a plurality of time series of values of said quantities relating to aircraft flights (1) in which, during corresponding time intervals ($T_m$), test manoeuvres ($M_m$) belonging to said macrocategories (MC) have been executed, the values of the training data structure (10) relating to the time interval ($T_m$) of each test manoeuvre ($M_m$) being labelled with a label indicative of the macrocategory (MC) to which the test manoeuvre ($M_m$) belongs, said output classifier (151;251;651;751) having been generated by executing, for each time instant ($t_{clkj}$) of a second succession of time instants ($t_{clk}$) that falls within a time interval ($T_m$) of a test manoeuvre ($M_m$), of the steps of:
   selecting (220), for each time duration ($TW'_p$) among said predetermined time durations (TW'), a corresponding subset of the training data structure (10) having a time extension equal to the time duration ($TW'_p$), the selected subsets of the training data structure (10) having a same time distance from the time instant ($t_{clkj}$) of the second succession of time instants ($t_{clk}$);
   from each selected subset of the training data structure (10), extracting (230) a corresponding first training feature vector ($FV'_{mpj}$);
   on the basis of the first training feature vectors ($FV'_{mpj}$), generating (150,160; 360,370; 150,160,360,370,700; 800) a corresponding training macrovector ($MPV'_{mj}$; $MPV''_{mj}$; $MPV''''_{mj}$; $MFV_{mj}$), alternatively by aggregation (800) of the first training feature vectors ($FV'_{mpj}$) or by:
   execution of classifications (150; 360; 150,360) of the first training feature vectors ($FV'_{mpj}$), said classifications being executed so as to generate a plurality of training prediction vectors ($PV'_{mpj}$;$PV''_{mpj}$), each of which is indicative, for each of said macrocategories (MC), of a corresponding probability that the test manoeuvre ($M_m$) belongs to said macrocategory (MC); and
   subsequent aggregation (160;370;700) of said plurality of training prediction vectors ($PV'_{mpj}$;$PV''_{mpj}$);
   said output classifier (151;251;651;751) having further been generated by performing, for each time instant ($t_{clkj}$) of the second succession of time instants ($t_{clk}$) that falls within a time interval ($T_m$) of a test manoeuvre ($M_m$), the step of:
   training (170;380;710;810) the output classifier (151;251; 651;751) in a supervised manner, on the basis of the corresponding training macrovector ($MPV'_{mj}$; $MPV''_{mj}$; $MPV''''_{mj}$; $MFV_{mj}$) and of the label indicative of the macrocategory (MC) to which the test manoeuvre ($M_m$) belongs.

3. Method according to claim 2, wherein said step of generating (330,335) a corresponding input macrovector ($MPVX'_k$) comprises, for each time instant ($t_{clkk}$) of the first succession of time instants ($t_{clk}$), the steps of:
   to each of the corresponding feature vectors ($FVX_{kp}$), applying (330) a first classifier (131), which is configured to generate a corresponding first strategy input prediction vector ($PVX'_{kp}$), the first strategy input prediction vectors ($PVX'_{kp}$) forming said plurality of input prediction vectors ($PVX'_{kp}$);
   aggregating (335) the first strategy input prediction vectors ($PVX'_{kp}$) into a first strategy input macrovector ($MPVX'_k$), which forms said input macrovector ($MPVX'_k$);
   and wherein the output classifier is formed by a first output classifier (151); and wherein said step of applying (338), for each time instant ($t_{clkk}$) of the first succession of time instants ($t_{clk}$), an output classifier (151) to the corresponding input macrovector ($MPVX'_k$) comprises applying (338) the first output classifier (151) to the corresponding first strategy input macrovector ($MPVX'_k$).

4. Method according to claim 3, wherein said first classifier (131) has been generated by performing the steps of:
   for each of said test manoeuvres ($M_m$), extracting (120) a corresponding entire manoeuvre feature vector ($FV_m$), starting from the portions of the time series of the training data structure (10) that extend in the time interval ($T_m$) of the test manoeuvre ($M_m$); and training (130) the first classifier (131) in a supervised manner on the basis of the entire manoeuvre feature vectors ($FV_m$) and of the labels indicative of the macrocategories (MC) to which the corresponding test manoeuvres ($M_m$) belong;

and wherein the first output classifier (151) has been generated by performing, for each time instant ($t_{clkj}$) of the second succession of time instants ($t_{clk}$) that falls within a time interval ($T_m$) of a test manoeuvre ($M_m$), the steps of:

applying (150) the first classifier (131) to the corresponding first training feature vectors ($FV'_{mpj}$), so as to obtain a number of first strategy training prediction vectors ($PV'_{mpj}$) equal to the number of time durations (TW'), said first strategy training prediction vectors ($PV'_{mpj}$) forming said plurality of training prediction vectors ($PV'_{mpj}$); and aggregating (160) said number of first strategy training prediction vectors ($PV'_{mpj}$), so as to form a corresponding first training prediction macrovector ($MPV'_{mj}$), which forms said training macrovector ($MPV'_{mj}$);

training (170) the first output classifier (151) in a supervised manner on the basis of the corresponding first training prediction macrovector ($MPV'_{mj}$) and of the label indicative of the macrocategory (MC) to which the test manoeuvre ($M_m$) belongs.

5. Method according to claim 2, wherein said step of generating (500,510) a corresponding input macrovector ($MPVX''_k$) comprises, for each time instant ($t_{clkk}$) of the first succession of time instants ($t_{clk}$), the steps of:

for each time duration ($TW'_p$) among said predetermined time durations (TW'), applying (500) to the feature vector ($FVX_{kp}$) relating to said time instant ($t_{clkk}$) and to said time duration ($TW'_p$) a corresponding second classifier ($CLASS_p$) among a number of different second classifiers (CLASS) equal to said number of predetermined time durations (TW'), said corresponding second classifier ($CLASS_p$) being configured to generate a corresponding second strategy input prediction vector ($PVX''_{kp}$), the second strategy input prediction vectors ($PVX''_{kp}$) forming said plurality of input prediction vectors ($PVX''_{kp}$);

aggregating (510) the second strategy input prediction vectors ($PVX''_{kp}$) into a second strategy input macrovector ($MPVX''_k$), which forms said input macrovector ($MPVX''_k$);

and wherein the output classifier is formed by a second output classifier (251); and wherein said step of applying, for each time instant ($t_{clkk}$) of the first succession of time instants ($t_{clk}$), an output classifier (251) to the corresponding input macrovector ($MPVX''_k$) comprises applying (520) the second output classifier (251) to the corresponding second strategy input macrovector ($MPVX''_k$).

6. Method according to claim 5, wherein each second classifier ($CLASS_p$) has been generated by performing, for each of said test manoeuvres ($M_m$), the steps of:

selecting (430,460) a number of corresponding subsets of the portion ($DG_m$) of the training data structure (10) that extends in the time interval ($T_m$) of the test manoeuvre ($M_m$), each of the selected subsets having a time extension not higher than the time duration ($TW'_p$) corresponding to the second classifier ($CLASS_p$);

from each selected subset of the portion ($DG_m$) of the training data structure (10) that extends in the time interval ($T_m$) of the test manoeuvre ($M_m$), extracting (440,470) a corresponding second training feature vector ($FV''_{mpu}$); and training (350) the second classifier ($CLASS_p$) in a supervised manner on the basis of the extracted second training feature vectors ($FV''_{mpu}$) and of the label indicative of the macrocategory (MC) to which the test manoeuvre ($M_m$) belongs;

and wherein the second output classifier (251) has been generated by performing, for each time instant ($t_{clkj}$) of the second succession of time instants ($t_{clk}$) that falls within a time interval ($T_m$) of a test manoeuvre ($M_m$), the steps of:

for each time duration ($TW'_p$), applying (360) the second classifier ($CLASS_p$) that corresponds to the time duration ($TW'_p$) to the first training feature vector ($FV'_{mpj}$) that corresponds to said time instant ($t_{clkj}$) and has been extracted from the selected subset of the training data structure (10) having a time extension equal to the time duration ($TW'_p$), so as to obtain a corresponding second strategy training prediction vector ($PV''_{mpj}$), the second strategy training prediction vectors ($PV''_{mpj}$) forming said plurality of training prediction vectors ($PV''_{mpj}$);

aggregating (370) the second strategy training prediction vectors ($PV''_{mpj}$), so as to form a corresponding second training prediction macrovector ($MPV''_{mj}$), which forms said training macrovector ($MPV''_{mj}$);

training (380) the second output classifier (251) in a supervised manner on the basis of the corresponding second training prediction macrovector ($MPV''_{mj}$) and of the label indicative of the macrocategory (MC) to which the test manoeuvre ($M_m$) belongs.

7. Method according to claim 2, wherein said step of generating (720) a corresponding input macrovector ($MPVX''_k$) comprises, for each time instant ($t_{clkk}$) of the first succession of time instants ($t_{clk}$), the steps of:

to each of the corresponding feature vectors ($FVX_{kp}$), applying (330) a first classifier (131), which is configured to generate a corresponding first strategy input prediction vector ($PVX'_{kp}$);

for each time duration ($TW'_p$) among said predetermined time durations (TW'), applying (500) to the feature vector ($FVX_{kp}$) relating to said time instant ($t_{clkk}$) and to said time duration ($TW'_p$) a corresponding second classifier ($CLASS_p$) among a number of different second classifiers (CLASS) equal to said number of predetermined time durations (TW'), said corresponding second classifier ($CLASS_p$) being configured to generate a corresponding second strategy input prediction vector ($PVX''_{kp}$), the first and second strategy input prediction vectors ($PVX'_{kp}$, $PVX''_{kp}$) forming said plurality of input prediction vectors ($PVX'_{kp}$, $PVX''_{kp}$);

aggregating (720) the first and second strategy input prediction vectors ($PVX'_{kp}$, $PVX''_{kp}$) into a third strategy input macrovector ($MPVX'''_k$), which forms said input macrovector ($MPVX'''_k$);

and wherein the output classifier is formed by a third output classifier (651); and wherein said step of applying, for each time instant ($t_{clkk}$) of the first succession of time instants ($t_{clk}$), an output classifier (651) to the corresponding input macrovector ($MPVX'''_k$) comprises applying (730) the third output classifier (651) to the corresponding third strategy input macrovector ($MPVX'''_k$).

8. Method according to claim 7, wherein the first classifier (131) was generated by performing the steps of:
  for each of said test manoeuvres ($M_m$), extracting (120) a corresponding entire manoeuvre feature vector ($FV_m$), starting from the portions of the time series of the training data structure (10) that extend in the time interval ($T_m$) of the test manoeuvre ($M_m$); and
  training (130) the first classifier (131) in a supervised manner on the basis of the entire manoeuvre feature vectors ($FV_m$) and of the labels indicative of the macrocategories (MC) to which the corresponding test manoeuvres ($M_m$) belong;
and wherein each second classifier ($CLASS_p$) has been generated by performing, for each of said test manoeuvres ($M_m$), the steps of:
  selecting (430,460) a number of corresponding subsets of the portion ($DG_m$) of the training data structure (10) that extends in the time interval ($T_m$) of the test manoeuvre ($M_m$), each of the selected subsets having a time extension not higher than the time duration ($TW'_p$) corresponding to the second classifier ($CLASS_p$);
  from each selected subset of the portion ($DG_m$) of the training data structure (10) that extends in the time interval ($T_m$) of the test manoeuvre ($M_m$), extracting (440,470) a corresponding second training feature vector ($FV''_{mpu}$); and
  training (350) the second classifier ($CLASS_p$) in a supervised manner on the basis of the extracted second training feature vectors ($FV''_{mpu}$) and of the label indicative of the macrocategory (MC) to which the test manoeuvre ($M_m$) belongs;
and wherein the third output classifier (651) has been generated by performing, for each time instant ($t_{clkj}$) of the second succession of time instants ($t_{clk}$) that falls within a time interval ($T_m$) of a test manoeuvre ($M_m$), the steps of:
  applying (150) the first classifier (131) to the corresponding first training feature vectors ($FV'_{mpj}$), so as to obtain a number of first strategy training prediction vectors ($PV'_{mpj}$) equal to the number of predetermined time durations (TW');
  for each time duration ($TW'_p$), applying (360) the second classifier ($CLASS_p$) that corresponds at the time duration ($TW'_p$) to the first training feature vector ($FV'_{mpj}$) that corresponds to said time instant ($t_{clkj}$) and has been extracted from the selected subset of the training data structure (10) having a time extension equal to the time duration ($TW'_p$), so as to obtain a corresponding second strategy training prediction vector ($PV''_{mpj}$), the first and second strategy training prediction vectors ($PV'_{mpj}$, $PV''_{mpj}$) forming said plurality of training prediction vectors ($PV'_{mpj}$, $PV''_{mpj}$);
  aggregating (700) said number of first and second strategy training prediction vectors ($PV'_{mpj}$, $PV''_{mpj}$), so as to form a corresponding third training prediction macrovector ($MPV'''_{mj}$), which forms said training macrovector ($MPV'''_{mj}$);
  training (710) the third output classifier (651) in a supervised manner on the basis of the corresponding third training prediction macrovector ($MPV'''_{mj}$) and of the label indicative of the macrocategory (MC) to which the test manoeuvre ($M_m$) belongs.

9. Method according to claim 1, further comprising performing, for each time instant ($t_{clkk}$) of the first succession of time instants ($t_{clk}$), the steps of:
  for each time duration ($TW'_p$), applying (910) to the feature vector ($FVX_{kp}$) that corresponds to said time duration ($TW'_p$) and to said time instant ($t_{clkk}$) a number of single-class classifiers ($SCC_1$) equal to the number of macrocategories (MC), each single-class classifier ($SCC_1$) being configured to generate a corresponding probability value, which is indicative of the probability that in said time instant ($t_{clkk}$) of the first succession of time instants ($t_{clk}$) the aircraft (3) was executing a manoeuvre belonging to a macrocategory (MC) corresponding to the single-class classifier ($SCC_1$);
  for each single-class classifier ($SCC_1$), calculating (920) a corresponding statistical quantity on the basis of the probability values generated by the single-class classifier ($SCC_1$);
  on the basis of the calculated statistical quantities ($OUT\_UPDATE_k$), detecting (930) the execution of manoeuvres belonging to multiple macrocategories; and
  in case of non-detection of the execution of manoeuvres belonging to multiple macrocategories, performing said step of detecting (940,951) the macrocategory (MC) to which the manoeuvre executed by the aircraft (3) belongs on the basis of the output vector ($OUT\_A_k$; $OUT\_B_k$; $OUT\_C_k$; $OUT\_D_k$), otherwise executing a step of detecting (950,951) the macrocategory (MC) to which the manoeuvre executed by the aircraft (3) in said time instant ($t_{clkk}$) of the first succession of time instants ($t_{clk}$) belongs on the basis of said calculated statistical quantities ($OUT\_UPDATE_k$).

10. Method according to claim 9, wherein said output classifier (151;251;651;751) has been generated starting from a training data structure (10) including a plurality of time series of values of said quantities relating to aircraft flights (1) in which, during corresponding time intervals ($T_m$), test manoeuvres ($M_m$) belonging to said macrocategories (MC) have been executed, the values of the training data structure (10) relating to the time interval ($T_m$) of each test manoeuvre ($M_m$) being labelled with a label indicative of the macrocategory (MC) to which the test manoeuvre ($M_m$) belongs, said output classifier (151;251;651;751) having been generated by executing, for each time instant ($t_{clkj}$) of a second succession of time instants ($t_{clk}$) that falls within a time interval ($T_m$) of a test manoeuvre ($M_m$), of the steps of:
  selecting (220), for each time duration ($TW'_p$) among said predetermined time durations (TW'), a corresponding subset of the training data structure (10) having a time extension equal to the time duration ($TW'_p$), the selected subsets of the training data structure (10) having a same time distance from the time instant ($t_{clkj}$) of the second succession of time instants ($t_{clk}$);
  from each selected subset of the training data structure (10), extracting (230) a corresponding first training feature vector (FV'mpj);
  on the basis of the first training feature vectors (FV'mpj), generating (150,160; 360,370; 150,160,360,370,700; 800) a corresponding training macrovector ($MPV'_{mj}$; $MPV''_{mj}$; $MPV'''_{mj}$; $MFV_{mj}$), alternatively by aggregation (800) of the first training feature vectors (FV'mpj) or by:
    execution of classifications (150; 360; 150,360) of the first training feature vectors ($FV'_{mpj}$), said classifications being executed so as to generate a plurality of training prediction vectors ($PV'_{mpj}$; $PV''_{mpj}$), each of which is indicative, for each of said macrocategories (MC), of a corresponding probability that the test manoeuvre ($M_m$) belongs to said macrocategory (MC); and
    subsequent aggregation (160;370;700) of said plurality of training prediction vectors ($PV'_{mpj}$; $PV''_{mpj}$);

said output classifier (151;251;651;751) having further been generated by performing, for each time instant ($t_{clkj}$) of the second succession of time instants ($t_{clk}$) that falls within a time interval ($T_m$) of a test manoeuvre ($M_m$), the step of:

training (170;380;710;810) the output classifier (151;251;651;751) in a supervised manner, on the basis of the corresponding training macrovector (MPV'$_{mj}$; MPV''$_{mj}$; MPV'''$_{mj}$; MFV$_{mj}$) and of the label indicative of the macrocategory (MC) to which the test manoeuvre ($M_m$) belongs;

and wherein each single-class classifier (SCC$_1$) has been generated by performing, for each of said test manoeuvres ($M_m$), the steps of:

extracting (120) a corresponding entire manoeuvre feature vector (FV$_m$), starting from the portions of the time series of the training data structure (10) that extend in the time interval ($T_m$) of the test manoeuvre ($M_m$); and training the single-class classifier (SCC$_1$) in a supervised manner on the basis of the extracted entire manoeuvre feature vector (FV$_m$) and of a label which is indicative of the match between the macrocategory (MC) of the test manoeuvre ($M_m$) and the macrocategory (MC$_i$) that corresponds to the single-class classifier (SCC$_1$).

11. Method according to claim 1, further comprising performing, for each time instant ($t_{clkk}$) of the first succession of time instants ($t_{clk}$), the steps of:

for each time duration (TW'$_p$), applying (910) to the feature vector (FVX$_{kp}$) that corresponds to said time duration (TW'$_p$) and to said time instant ($t_{clkk}$) a plurality of respective single-class classifiers (SCC'$_{pi}$) that correspond to said time duration (TW'$_p$), each of which is configured to generate a corresponding probability value indicative of the probability that in said time instant ($t_{clkk}$) of the first succession of time instants ($t_{clk}$) the aircraft (3) was executing a manoeuvre belonging to a macrocategory (MC) corresponding to the single-class classifier (SCC$_{pi}$);

for each macrocategory (MC$_i$), calculating (980) a corresponding statistical quantity on the basis of probability values generated by the single-class classifiers (SCC$_{pi}$) that correspond to said macrocategory (MC$_i$) and, respectively, to the time durations (TW'$_p$);

on the basis of the calculated statistical quantities (OUT_UPDATE'$_k$), detecting (985) the execution of manoeuvres belonging to multiple macrocategories; and in case of non-detection of the execution of manoeuvres belonging to multiple macrocategories, performing said step of detecting (940,951) the macrocategory (MC) to which the manoeuvre executed by the aircraft (3) belongs on the basis of the output vector (OUT_A$_k$; OUT_B$_k$; OUT_C$_k$; OUT_D$_k$), otherwise performing a step of detecting (951,990) the macrocategory (MC) to which the manoeuvre executed by the aircraft (3) in said time instant ($t_{clkk}$) of the first succession of time instants ($t_{clk}$) belongs on the basis of said calculated statistical quantities (OUT_UPDATE'$_k$).

12. Method according to claim 11, wherein said output classifier (151;251;651;751) has been generated starting from a training data structure (10) including a plurality of time series of values of said quantities relating to aircraft flights (1) in which, during corresponding time intervals ($T_m$), test manoeuvres ($M_m$) belonging to said macrocategories (MC) have been executed, the values of the training data structure (10) relating to the time interval ($T_m$) of each test manoeuvre ($M_m$) being labelled with a label indicative of the macrocategory (MC) to which the test manoeuvre ($M_m$) belongs, said output classifier (151;251;651;751) having been generated by executing, for each time instant ($t_{clkj}$) of a second succession of time instants ($t_{clk}$) that falls within a time interval ($T_m$) of a test manoeuvre ($M_m$), of the steps of:

selecting (220), for each time duration (TW'$_p$) among said predetermined time durations (TW'), a corresponding subset of the training data structure (10) having a time extension equal to the time duration (TW'$_p$), the selected subsets of the training data structure (10) having a same time distance from the time instant ($t_{clkj}$) of the second succession of time instants ($t_{clk}$);

from each selected subset of the training data structure (10), extracting (230) a corresponding first training feature vector (FV'$_{mpj}$);

on the basis of the first training feature vectors (FV'$_{mpj}$), generating (150,160; 360,370; 150,160,360,370,700; 800) a corresponding training macrovector (MPV'$_{mj}$; MPV''$_{mj}$; MPV'''$_{mj}$; MFV$_{mj}$), alternatively by aggregation (800) of the first training feature vectors (FV'$_{mpj}$) or by:

execution of classifications (150; 360; 150,360) of the first training feature vectors (FV'$_{mpj}$), said classifications being executed so as to generate a plurality of training prediction vectors (PV'$_{mpj}$;PV''$_{mpj}$), each of which is indicative, for each of said macrocategories (MC), of a corresponding probability that the test manoeuvre ($M_m$) belongs to said macrocategory (MC); and subsequent aggregation (160;370;700) of said plurality of training prediction vectors (PV'$_{mpj}$;PV''$_{mpj}$);

said output classifier (151;251;651;751) having further been generated by performing, for each time instant ($t_{clkj}$) of the second succession of time instants ($t_{clk}$) that falls within a time interval ($T_m$) of a test manoeuvre ($M_m$), the step of:

training (170;380;710;810) the output classifier (151;251;651;751) in a supervised manner, on the basis of the corresponding training macrovector (MPV'$_{mj}$; MPV''$_{mj}$; MPV'''$_{mj}$; MFV$_{mj}$) and of the label indicative of the macrocategory (MC) to which the test manoeuvre ($M_m$) belongs;

and wherein each single-class classifier (SCC'$_{pi}$) has been generated by performing, for each of said test manoeuvres ($M_m$), the steps of:

selecting (430,460) a number of corresponding subsets of the portion (DG$_m$) of the training data structure (10) that extends in the time interval ($T_m$) of the test manoeuvre ($M_m$), each of the selected subsets having a time extension not higher than the time duration (TW'$_p$) corresponding to the second single-class classifier (SCAC'$_{pi}$);

from each selected subset of the portion (DG$_m$) of the training data structure (10) that extends in the time interval ($T_m$) of the test manoeuvre ($M_m$), extracting (440,470) a corresponding second training feature vector (FV''$_{mpu}$); and training (960) in a supervised manner the single-class classifier (SCC'$_{pi}$), on the basis of the extracted second training feature vectors (FV''$_{mpu}$) and of a label indicative of the match between the macrocategory (MC) of the test manoeuvre ($M_m$) and the macrocategory (MC$_i$) corresponding to the single-class classifier (SCC'$_{pi}$).

13. Method according to claim 1, further comprising the step of:

on the basis of the macrocategory (MC) detected, identifying (991) the manoeuvre executed by the aircraft (3) in said time instant ($t_{clkk}$) of the first succession of time instants ($t_{clk}$), on the basis of at least a value of at least one among said quantities relating to the flight of the aircraft (3).

14. Method according to claim 9, further comprising the steps of:
- in case of non-detection of the execution of manoeuvres belonging to multiple macrocategories, identifying (991) the manoeuvre executed by the aircraft (3) in said time instant ($t_{clkk}$) of the first succession of time instants ($t_{clk}$) on the basis of the macrocategory (MC) detected on the basis of the output vector (OUT_$A_k$; OUT_$B_k$; OUT_$C_k$; OUT_$D_k$) and of at least one value of at least one among said quantities relating to the flight of the aircraft (3);
- in case of detection of the execution of manoeuvres belonging to multiple macrocategories, identifying (991) the manoeuvre executed by the aircraft (3) in said time instant ($t_{clkk}$) of the first succession of time instants ($t_{clk}$) on the basis of the macrocategory (MC) detected on the basis of said calculated statistical quantities (OUT_UPDATE$_k$; OUT_UPDATE'$_k$) and of at least one value of at least one among said quantities relating to the flight of the aircraft (3).

15. Computer-implemented method for determining the state of usage of an aircraft (3), comprising:
- storing information correlating load data to manoeuvres;
- carrying out the method according to claim 13- or 14;
- determining at least one quantity indicative of said state of usage on the basis of the identified manoeuvre.

16. Processing system comprising means configured to carry out the method according to claim 1.

17. Computer program comprising instructions which, when the program is executed by a computer (12), cause the execution of the method according to claim 1.

18. Computer medium readable by a computer (12), on which the computer program according to claim 17 is stored.

* * * * *